US012764364B2

(12) United States Patent
Wang et al.

(10) Patent No.: US 12,764,364 B2
(45) Date of Patent: Oct. 13, 2026

(54) ENGAGEMENT PREDICTION NETWORK BASED ON VIDEO CONTENT

(71) Applicant: Snap Inc., Santa Monica, CA (US)

(72) Inventors: Jian Wang, West New York, NJ (US); Dasong Li, Jersey City, NJ (US); Sizhuo Ma, Long Island City, WI (US); Wenjie Li, Palo Alto, CA (US); Baili Lu, Sunnyvale, CA (US); Gurunandan Krishnan Gorumkonda, Kirkland, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/091,496

(22) Filed: Mar. 26, 2025

(65) Prior Publication Data

US 2026/0303889 A1 Oct. 1, 2026

(51) Int. Cl.
*H04N 21/25* (2011.01)
*H04N 21/233* (2011.01)
*H04N 21/234* (2011.01)

(52) U.S. Cl.
CPC ......... *H04N 21/251* (2013.01); *H04N 21/233* (2013.01); *H04N 21/23418* (2013.01)

(58) Field of Classification Search
CPC ............... H04N 21/251; H04N 21/233; H04N 21/23418
See application file for complete search history.

(56) References Cited

U.S. PATENT DOCUMENTS 9,681,158 B1 * 6/2017 Gargi ................ G06F 17/30849

FOREIGN PATENT DOCUMENTS

CN 117253164 A * 12/2023 ............. G06V 20/46
WO WO-2013126589 A1 * 8/2013 ........... H04N 21/251

OTHER PUBLICATIONS

Wu, S., Rizoiu, M.A., Xie, L.: "Beyond Views: Measuring and Predicting Engagement in Online Videos." Proceedings of the International AAAI Conference on Web and Social Media 12(1) (Jun. 2018). https://doi.org/10.1609/icwsm.v12i1.15031, https://ojs.aaai.org/index.php/ICWSM/article/view/15031.

(Continued)

*Primary Examiner* — Anthony Bantamoi
(74) *Attorney, Agent, or Firm* — CM Law PLLC; Stephen J. Weed

(57) ABSTRACT

Technological improvements are described for predicting user engagement with newly published, un-viewed, relatively short videos based on features extracted from the video content itself. A network includes an extraction module for extracting features from the video content and encoding the text-based features. The visual features are processed using learnable, per-frame and per-clip multilayer perceptrons (MLPs) and using multi-modal cross-attention mechanisms. A fusion module merges a set of predicted features based on the results generated by the MLPs. A temporal aggregation module uses a multi-layer self-attention architecture to combine the fused features and obtain a set of temporal aggregated features. The network uses two branches (consisting of MLP layers) to jointly predict two new engagement metrics: a normalized action watch percentage (NAWP) and an engagement continuation rate (ECR). A recommendation system uses the predicted NAWP and the predicted ECR to generate a recommendation associated with the un-viewed video.

20 Claims, 9 Drawing Sheets

(56) References Cited

OTHER PUBLICATIONS

Wu, X., Hu, P., Wu, Y., Lyu, X., Cao, Y.P., Shan, Y., Yang, W., Sun, Z., Qi, X.: "Speech2Lip: High-Fidelity Speech to Lip Generation by Learning from a Short Video." In: Proceedings of the IEEE/CVF International Conference on Computer Vision (ICCV). pp. 22168-22177 (Oct. 2023).

Xu, H., Ye, Q., Yan, M., Shi, Y., Ye, J., Xu, Y., Li, C., Bi, B., Qian, Q., Wang, W., Xu, G., Zhang, J., Huang, S., Huang, F., Zhou, J.: "mPLUG-2: A Modularized Multi-Modal Foundation Model Across Text, Image and Video." ArXiv abs/2302.00402 (2023).

Yang, J., She, D., Lai, Y.K., Rosin, P.L., Yang, M.H.: "Weakly Supervised Coupled Networks for Visual Sentiment Analysis." In: The IEEE Conference on Computer Vision and Pattern Recognition (2018).

Yim, J.G., Wang, Y., Birkbeck, N., Adsumilli, B.: "Subjective Quality Assessment for Youtube UGC Dataset." In: 2020 IEEE International Conference on Image Processing (ICIP). pp. 131-135 (2020).

Ying, Z., Mandal, M., Ghadiyaram, D., Bovik, A.: "Patch-VQ: 'Patching Up' the Video Quality Problem." In: Proceedings of the IEEE/CVF Conference on Computer Vision and Pattern Recognition (CVPR)). pp. 14019-14029 (Jun. 2021).

Zhan, R., Pei, C., Su, Q., Wen, J., Wang, X., Mu, G., Zheng, D., Jiang, P., Gai, K.: "Deconfounding Duration Bias in Watch-time Prediction for Video Recommendation." In: Proceedings of the 28th ACM SIGKDD Conference on Knowledge Discovery and Data Mining. p. 4472-4481. KDD '22, Association for Computing Machinery, New York, NY, USA (2022). https://doi.org/10.1145/3534678.3539092, https://doi.org/10.1145/3534678.3539092.

Zhang, W., Zhai, G., Wei, Y., Yang, X., Ma, K.: "Blind Image Quality Assessment via Vision-Language Correspondence: A Multitask Learning Perspective." In: Proceedings of the IEEE/CVF Conference on Computer Vision and Pattern Recognition (CVPR). pp. 14071-14081 (Jun. 2023).

Zhang, Y., Li, D., Law, K.L., Wang, X., Qin, H., Li, H.: "IDR: Self-Supervised Image Denoising via Iterative Data Refinement." In: Proceedings of the IEEE/CVF Conference on Computer Vision and Pattern Recognition (2022).

Zhang, Y., Li, D., Shi, X., He, D., Song, K., Wang, X., Qin, H., Li, H.: "KBNet: Kernel Basis Network for Image Restoration." arXiv preprint arXiv:2303.02881 (2023).

Zhang, Y., Shi, X., Li, D., Wang, X., Wang, J., Li, H.: "A Unified Conditional Framework for Diffusion-Based Image Restoration." arXiv preprint arXiv:2305.20049 (2023).

Zhang, Z., Wu, W., Sun, W., Tu, D., Lu, W., Min, X., Chen, Y., Zhai, G.: "MD-VQA: Multi-Dimensional Quality Assessment for UGC Live Videos." In: Proceedings of the IEEE/CVF Conference on Computer Vision and Pattern Recognition (CVPR). pp. 1746-1755 (Jun. 2023).

Zhu, Y., Xie, R., Zhuang, F., Ge, K., Sun, Y., Zhang, X., Lin, L., Cao, J.: "Learning to Warm Up Cold Item Embeddings for Cold-Start Recommendation with Meta Scaling and Shifting Networks." In: Proceedings of the 44th International ACM SIGIR Conference on Research and Development in Information Retrieval. p. 1167-1176. SIGIR '21, Association for Computing Machinery, New York, NY, USA (2021). https://doi.org/10.1145/3404835.3462843, https://doi.org/ 10.1145/3404835.3462843.

Li, Dasong; Li, Wenjie; Lu, Baili; Li, Hongsheng; Ma, Sizhuo; Krishnan, Gurunandan; and, Wang, Jian: "Delving Deep into Engagement Prediction of Short Videos," arXiv:2410.00289v1 [cs.CV] Sep. 30, 2024.

Wang, Haiqiang and Li, Gary and Liu, Shan and Kuo, C.-C. Jay, "ICME 2021 UGC-VQA Challenge.", [Online] Available: http://ugcvqa.com/.

Abadi, M., Agarwal, A., Barham, P., Brevdo, E., Chen, Z., Citro, C., Corrado, G.S., Davis, A., Dean, J., Devin, M., Ghemawat, S., Goodfellow, I., Harp, A., Irving, G., Isard, M., Jia, Y., Jozefowicz, R., Kaiser, L., Kudlur, M., Levenberg, J., Mané, D., Monga, R., Moore, S., Murray, D., Olah, C., Schuster, M., Shlens, J., Steiner, B., Sutskever, I., Talwar, K., Tucker, P., Vanhoucke, V., Vasudevan, V., Viégas, F., Vinyals, O., Warden, P., Wattenberg, M., Wicke, M., Yu, Y., Zheng, X.: "TensorFlow: Large-Scale Machine Learning on Heterogeneous Systems" (2015), https://www.

Bulathwela, S., Perez-Ortiz, M., Yilmaz, E., Shawe-Taylor, J.: "VLEngagement: A Dataset of Scientific Video Lectures for Evaluating Population-based Engagement." arXiv e-prints arXiv:2011.02273 (Nov. 2020). https://doi.org/10.48550/arXiv. 2011.02273.

Chen, B., Zhu, L., Li, G., Lu, F., Fan, H., Wang, S.: "Learning Generalized Spatial-Temporal Deep Feature Representation for No-Reference Video Quality Assessment." IEEE Transactions on Circuits and Systems for Video Technology 32(4), 1903-1916 (2022). https://doi.org/10.1109/TCSVT.2021.3088505.

Chen, P., Li, L., Ma, L., Wu, J., Shi, G.: "RIRNet: Recurrent-in-recurrent network for video quality assessment." In: Proceedings of the 28th ACM International Conference on Multimedia. p. 834-842. MM '20, Association for Computing Machinery, New York, NY, USA (2020). https://doi.org/10.1145/3394171.3413717, https://doi.org/10.1145/3394171.3413717.

Cho, K., van Merrienboer, B., Gülçehre, Ç., Bahdanau, D., Bougares, F., Schwenk, H., Bengio, Y.: "Learning phrase representations using RNN encoder-decoder for statistical machine translation." In: Proceedings of the 2014 Conference on Empirical Methods in Natural Language Processing (EMNLP). pp. 1724-1734. ACL (2014).

Deng, J., Dong, W., Socher, R., Li, L.J., Li, K., Fei-Fei, L.: "ImageNet: A large-scale hierarchical image database." In: Proceedings of the IEEE/CVF Conference on Computer Vision and Pattern Recognition (CVPR). pp. 248-255 (2009).

Ghadiyaram, D., Pan, J., Bovik, A.C., Moorthy, A.K., Panda, P., Yang, K.C.: "In-capture mobile video distortions: A study of subjective behavior and objective algorithms." IEEE Transactions on Circuits and Systems for Video Technology 28(9), 2061-2077 (2018).

Götz-Hahn, F., Hosu, V., Lin, H., Saupe, D.: "Konvid-150k: A dataset for no-reference video quality assessment of videos in-the-wild." In: IEEE Access 9. pp. 72139-72160. IEEE (2021).

Gupta, V., Mittal, T., Mathur, P., Mishra, V., Maheshwari, M., Bera, A., Mukher-jee, D., Manocha, D.: "3MASSIV: Multilingual, multimodal and multi-aspect dataset of social media short videos." In: Proceedings of the IEEE/CVF Conference on Computer Vision and Pattern Recognition (CVPR). pp. 21064-21075 (Jun. 2022).

Hara, K., Kataoka, H., Satoh, Y.: "Can Spatiotemporal 3D CNNs Retrace the History of 2D CNNs and ImageNet?" In: Proceedings of the IEEE Conference on Computer Vision and Pattern Recognition (CVPR). pp. 6546-6555 (2018).

He, K., Zhang, X., Ren, S., Sun, J.: "Deep residual learning for image recognition." In: Proceedings of the IEEE/CVF Conference on Computer Vision and Pattern Recognition (CVPR). pp. 770-778 (2016).

Hosu, V., Hahn, F., Jenadeleh, M., Lin, H., Men, H., Sziranyi, T., Li, S., Saupe, D.: "The Konstanz Natural Video Database (KoNViD-1K)." In: Ninth International Conference on Quality of Multimedia Experience (QoMEX). pp. 1-6 (2017).

Ismail Fawaz, H., Lucas, B., Forestier, G., Pelletier, C., Schmidt, D.F., Weber, J., Webb, G.I., Idoumghar, L., Muller, P.A., Petitjean, F.: "Inception Time: Finding AlexNet for Time Series Classification." Data Mining and Knowledge Discovery (2020).

Kay, W., Carreira, J., Simonyan, K., Zhang, B., Hillier, C., Vijayanarasimhan, S., Viola, F., Green, T., Back, T., Natsev, A., Suleyman, M., Zisserman, A.: "The Kinetics Human Action Video Dataset." ArXiv abs/1705.06950 (2017).

Kim, J., Guo, P.J., Seaton, D.T., Mitros, P., Gajos, K.Z., Miller, R.C.: "Understanding In-Video Dropouts and Interaction Peaks in Online Lecture Videos." In: Proceedings of the First ACM Conference on Learning @ Scale Conference. p. 31-40. L@S '14, Association for Computing Machinery, New York, NY, USA (2014). https://doi.org/10.1145/2556325.2566237, https://doi.org/10.1145/2556325.2566237.

Kingma, D.P., Ba, J.: "ADAM: A Method for Stochastic Optimization." In: Bengio, Y., LeCun, Y. (eds.) 3rd International Confer-

(56) References Cited

OTHER PUBLICATIONS ence on Learning Representations, ICLR 2015, San Diego, CA, USA, May 7-9, 2015, Conference Track Proceedings (2015), http://arxiv.org/abs/1412.6980.
Korhonen, J.: "Two-Level Approach for No-Reference Consumer Video Quality Assessment." IEEE Transactions on Image Processing 28(12), 5923-5938 (2019).
Lee, H., Im, J., Jang, S., Cho, H., Chung, S.: "MeLU: Meta-Learned User Preference Estimator for Cold-Start Recommendation." In: Proceedings of the 25th ACM SIGKDD International Conference on Knowledge Discovery & Data Mining. p. 1073-1082. KDD '19, Association for Computing Machinery, New York, NY, USA (2019). https://doi.org/10.1145/3292500.3330859, https://doi.org/10.1145/3292500.3330859.
Li, D., Shi, X., Zhang, Y., Cheung, K.C., See, S., Wang, X., Qin, H., Li, H.: "A simple baseline for video restoration with grouped spatial-temporal shift." In: Proceedings of the IEEE/CVF Conference on Computer Vision and Pattern Recognition (CVPR). pp. 9822-9832 (Jun. 2023).
NPL 21. Li, D., Zhang, Y., Cheung, K.C., Wang, X., Qin, H., Li, H.: "Learning Degradation Representations for Image Deblurring". In: Avidan, S., Brostow, G., Cissé, M., Farinella, G.M., Hassner, T. (eds.) Computer Vision—ECCV 2022. pp. 736-753. Springer Nature Switzerland, Cham (2022).
Li, D., Zhang, Y., Law, K.L., Wang, X., Qin, H., Li, H.: "Efficient burst raw de-noising with variance stabilization and multi-frequency denoising network" (2022). https://doi.org/10.48550/ARXIV.2205.04721, https://arxiv.org/abs/2205. 04721.
Li, D., Jiang, T., Jiang, M.: "Quality Assessment of in-the-Wild Videos." In: Proceedings of the 27th ACM International Conference on Multimedia. p. 2351-2359. MM '19, Association for Computing Machinery, New York, NY, USA (2019).
Liao, L., Xu, K., Wu, H., Chen, C., Sun, W., Yan, Q., Lin, W.: Exploring the effectiveness of video perceptual representation in blind video quality assessment. In: Proceedings of the 30th ACM International Conference on Multimedia (ACMMM) (2022).
Lin, H., Hosu, V., Saupe, D.: "KADIDK-10K: A Large-Scale Artificially Distorted IQA Database." In: 2019 Eleventh International Conference on Quality of Multimedia Experience (QoMEX). pp. 1-3 (2019). https://doi.org/10.1109/QoMEX.2019. 8743252.
Liu, Y., Zhou, X., Yin, H., Wang, H., Yan, C.: "Efficient video quality assessment with deeper spatiotemporal feature extraction and integration." Journal of Electronic Imaging 30, 063034 (Nov. 2021). https://doi.org/10.1117/1.JEI.30.6. 063034.
Loshchilov, I., Hutter, F.: "SGDR: Stochastic Gradient Descent with Warm Restarts." In: 5th International Conference on Learning Representations, ICLR 2017, Toulon, France, Apr. 24-26, 2017, Conference Track Proceedings. OpenReview.net (2017), https://openreview.net/forum?id=Skq89Scxx.
Mittal, A., Saad, M.A., Bovik, A.C.: "A Completely Blind Video Integrity Oracle." IEEE Transactions on Image Processing 25(1), 289-300 (2016).
Nuutinen, M., Virtanen, T., Vaahteranoksa, M., Vuori, T., Oittinen, P., Häkkinen, J.: "CVD2014—A Database for Evaluating No-Reference Video Quality Assessment Algorithms." IEEE Transactions on Image Processing 25(7), 3073-3086 (2016).
Pan, F., Li, S., Ao, X., Tang, P., He, Q.: "Warm Up Cold-Start Advertisements: Improving CTR Predictions via Learning to Learn ID Embeddings." In: Proceedings of the 42nd International ACM SIGIR Conference on Research and Development in Information Retrieval. p. 695-704. SIGIR'19, Association for Computing Machinery, New York, NY, USA (2019). https://doi.org/10.1145/3331184.3331268, https://doi.org/10.1145/3331184.3331268.
Panda, R., Zhang, J., Li, H., Lee, J.Y., Lu, X., Roy-Chowdhury, A.K.: "Contemplating visual emotions: Understanding and overcoming dataset bias." In: European Conference on Computer Vision (2018).
Qing-Yuan, J., Yi, H., Gen, L., Jian, L., Lei, L., Wu-Jun, L.: "SVD: A large-scale short video dataset for near-duplicate video retrieval." In: Proceedings of International Conference on Computer Vision (2019).
Radford, A., Kim, J.W., Hallacy, C., Ramesh, A., Goh, G., Agarwal, S., Sastry, G., Askell, A., Mishkin, P., Clark, J., Krueger, G., Sutskever, I.: "Learning transferable visual models from natural language supervision." In: Meila, M., Zhang, T. (eds.) Proceedings of the 38th International Conference on Machine Learning, ICML 2021, Jul. 18-24, 2021, Virtual Event. Proceedings of Machine Learning Research, vol. 139, pp. 8748-8763. PMLR (2021), http://proceedings.mlr.press/v139/radford21a.html.
Raffel, C., Shazeer, N., Roberts, A., Lee, K., Narang, S., Matena, M., Zhou, Y., Li, W., Liu, P.J.: "Exploring the limits of transfer learning with a unified text-to-text transformer." Journal of Machine Learning Research 21(140), 1-67 (2020), http://jmlr.org/papers/v21/20-074.html.
Saad, M.A., Bovik, A.C., Charrier, C.: "Blind image quality assessment: A natural scene statistics approach in the DCT domain." IEEE Transactions on Image Processing 21(8), 3339-3352 (2012).
She, D., Yang, J., Cheng, M.M., Lai, Y.K., Rosin, P.L., Wang, L.: "WSCnet: Weakly supervised coupled networks for visual sentiment classification and detection." IEEE Transactions on Multimedia (2019).
Shi, X., Huang, Z., Bian, W., Li, D., Zhang, M., Cheung, K.C., See, S., Qin, H., Dai, J., Li, H.: : Videoflow: Exploiting temporal cues for multi-frame optical flow estimation. arXiv preprint arXiv:2303. 08340 (2023).
Shi, X., Huang, Z., Li, D., Zhang, M., Cheung, K.C., See, S., Qin, H., Dai, J., Li, H.: "Flowformer++: Masked cost volume autoencoding for pretraining optical flow estimation." In: Proceedings of the IEEE/CVF Conference on Computer Vision and Pattern Recognition. pp. 1599-1610 (2023).
Shi, X., Huang, Z., Wang, F.Y., Bian, W., Li, D., Zhang, Y., Zhang, M., Cheung, K. C., See, S., Qin, H., et al.: "Motion-i2v: Consistent and controllable image-to-video generation with explicit motion modeling." SIGGRAPH 2024 (2024).
Sinno, Z., Bovik, A.C.: "Large-Scale Study of Perceptual Video Quality." IEEE Trans-actions on Image Processing 28(2), 612-627 (2019).
Tan, M., Le, Q.V.: "Efficientnetv2: Smaller Models and Faster Training." In: Meila, M., Zhang, T. (eds.) Proceedings of the 38th International Conference on Ma-chine Learning, ICML 2021, Jul. 18-24, 2021, Virtual Event. Proceedings of Machine Learning Research, vol. 139, pp. 10096-10106. PMLR (2021), http://proceedings.mlr.press/v139/tan21a.html.
Tu, Z., Chen, C.J., Wang, Y., Birkbeck, N., Adsumilli, B., Bovik, A.C.: "Efficient User-Generated Video Quality Prediction." In: 2021 Picture Coding Symposium (PCS). pp. 1-5 (2021).
Tu, Z., Wang, Y., Birkbeck, N., Adsumilli, B., Bovik, A.C.: "UGC-VQA: Benchmarking blind video quality assessment for user generated content." IEEE Transactions on Image Processing 30, 4449-4464 (2021).
Vaswani, A., Shazeer, N., Parmar, N., Uszkoreit, J., Jones, L., Gomez, A.N., Kaiser, L., Polosukhin, I.: "Attention is all you need." In: Proceedings of the 31st International Conference on Neural Information Processing Systems. p. 6000-6010. NIPS'17, Curran Associates Inc., Red Hook, NY, USA (2017).
Volkovs, M., Yu, G., Poutanen, T.: "DropoutNet: Addressing cold start in recommender systems." In: Proceedings of the 31st International Conference on Neural Information Processing Systems. p. 4964-4973. NIPS'17, Curran Associates Inc., Red Hook, NY, USA (2017).
Wang, Y., Ke, J., Talebi, H., Yim, J.G., Birkbeck, N., Adsumilli, B., Milanfar, P., Yang, F.: "Rich Features for Perceptual Quality Assessment of UGC Videos." In: Proceedings of the IEEE/CVF Conference on Computer Vision and Pattern Recognition (CVPR). pp. 13435-13444 (Jun. 2021).
Wu, H., Chen, C., Hou, J., Liao, L., Wang, A., Sun, W., Yan, Q., Lin, W.: "Fast-VQA: Efficient End-to-End Video Quality Assessment with Fragment Sampling." Proceedings of European Conference of Computer Vision (ECCV) (2022).

(56) References Cited

OTHER PUBLICATIONS

Wu, H., Chen, C., Liao, L., Hou, J., Sun, W., Yan, Q., Gu, J., Lin, W.: "Neighbourhood Representative Sampling for Efficient End-to-End Video Quality Assessment" (2022).

Wu, H., Zhang, E., Liao, L., Chen, C., Hou, J., Wang, A., Sun, W., Yan, Q., Lin, W.: "Exploring Video Quality Assessment on User Generated Contents from Aesthetic and Technical Perspectives." In: Proceedings of the IEEE/CVF International Conference on Computer Vision (ICCV). pp. 20144-20154 (Oct. 2023).

* cited by examiner

ENGAGEMENT PREDICTION NETWORK BASED ON VIDEO CONTENT

TECHNICAL FIELD

Examples set forth in the present disclosure relate to methods and systems for predicting user engagement with video content. More particularly, but not by way of limitation, the present disclosure describes a system for predicting user engagement with newly published, un-viewed, short-form videos, based on features extracted from the video content.

BACKGROUND

An increasing number of users and content creators are publishing short-form videos on various social media platforms for a variety of purposes. Users devote a significant amount of time to watching short videos. Social media platforms use recommendation systems to categorize user-generated content and recommend videos to users according to the video categories.

Existing video content can be analyzed using engagement metrics, such as the number of views, user reactions (e.g., likes), and average watch time. By contrast, engagement metrics are not available yet for newly posted video content. Many social media platforms receive a nearly constant stream of new short-form video content.

Machine learning refers to mathematical models that improve incrementally through experience. By processing different input datasets, a machine-learning algorithm can develop improved generalizations about particular datasets; those generalizations can produce an accurate output or solution when processing a new dataset. Broadly speaking, a machine-learning algorithm includes one or more parameters that will adjust or change in response to new experiences, thereby improving the algorithm incrementally; a process similar to learning.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added letter referring to a specific element. When referring to a non-specific one or more elements the letter may be dropped.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures.

DETAILED DESCRIPTION

Figure 1:
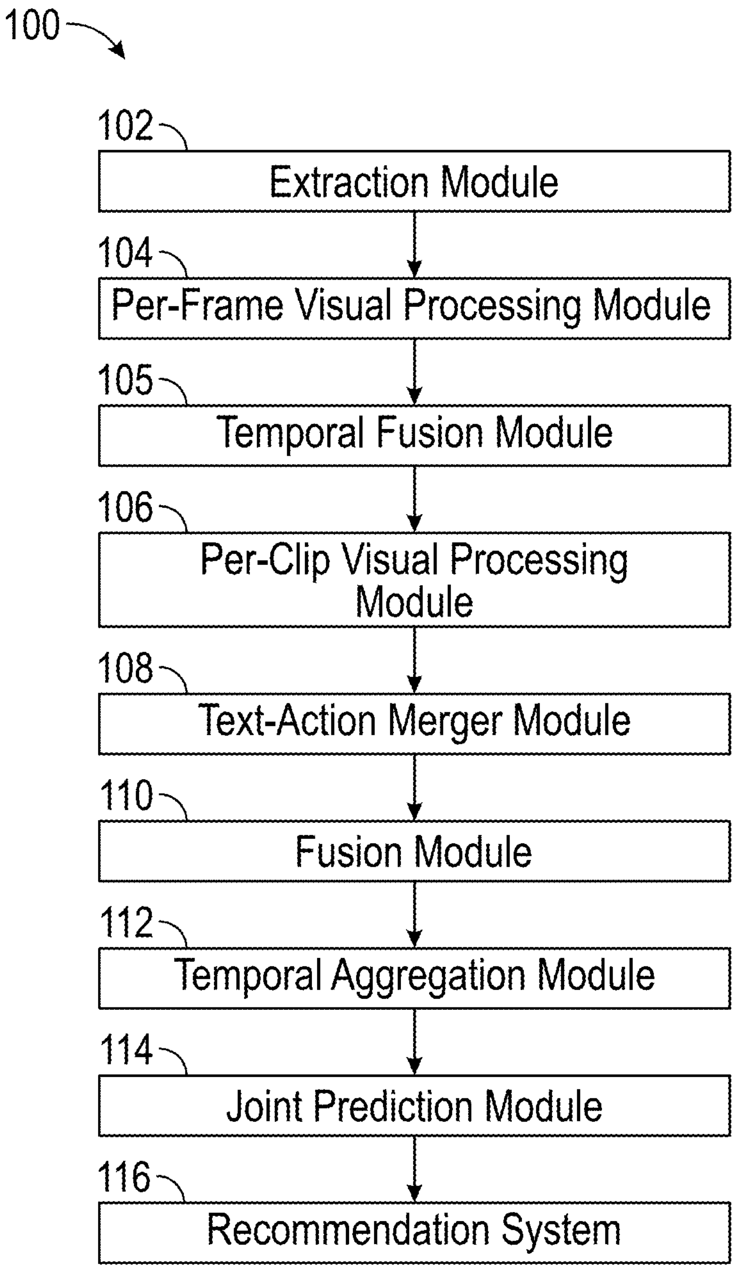
FIG. 1 is a diagram of an example network of modules according to the systems and methods described herein.

Described herein are techniques and systems for predicting user engagement with, for example, newly published, un-viewed, short videos (e.g., ten to sixty seconds) based on features extracted from the video content. The video is split into clips, each clip containing frames, for processing to generate a recommendation associated with the un-viewed video.

In an example, a network of machine-learning models includes an extraction module for extracting features from the video content and encoding the text-based features. Visual features are processed using learnable, multi-layer perceptrons (MLPs) and cross-attention mechanisms. A fusion module generates a set of fused features $$\{O_i\}_{i=1}^{M/L}$$

based on the results generated by the MLPs. A temporal aggregation module uses a multi-layer self-attention architecture to combine the fused features and obtain a set of temporal aggregated features $$\{H_i\}_{i=1}^{M/L}.$$

The network then uses two branches (consisting of MLP layers) to jointly generate a predicted normalized action watch percentage (NAWP) and a predicted engagement continuation rate (ECR), based on the set of temporal aggregated features. A recommendation system may use the predicted NAWP and the predicted ECR to generate a recommendation associated with the un-viewed video.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term “connect,” “connected,” “couple,” and “coupled” as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Although the examples herein are predominantly discussed in the context of newly published, un-viewed, user-generated content dataset that includes video content of relatively short duration (e.g., ten to sixty seconds,) the techniques and systems described herein may be applied to video content of any duration, previously published or viewed videos, and video content generated by amateur users, content creators, commercial producers, or any of a variety of other sources. Moreover, the techniques and systems described herein may be adapted for use in analyzing content other than video.

Many social media platforms receive a nearly constant stream of new short-form video content. For newly published content, engagement metrics such as the number of views, likes, and average watch time, are not available. New videos are sometimes referred to as cold-start items. In some cases, platforms will present a new video to a restricted number of test users (e.g., one hundred) and then collect the engagement metrics, which serves as a basis for making further recommendations. Testing in this manner causes delay, introduces a sampling bias, and produces noisy and inaccurate predictions. Delay in publishing the content more widely may inhibit creators from making edits or adjustments based on viewer feedback, and may discourage creators from posting more content.

Figure 3A:
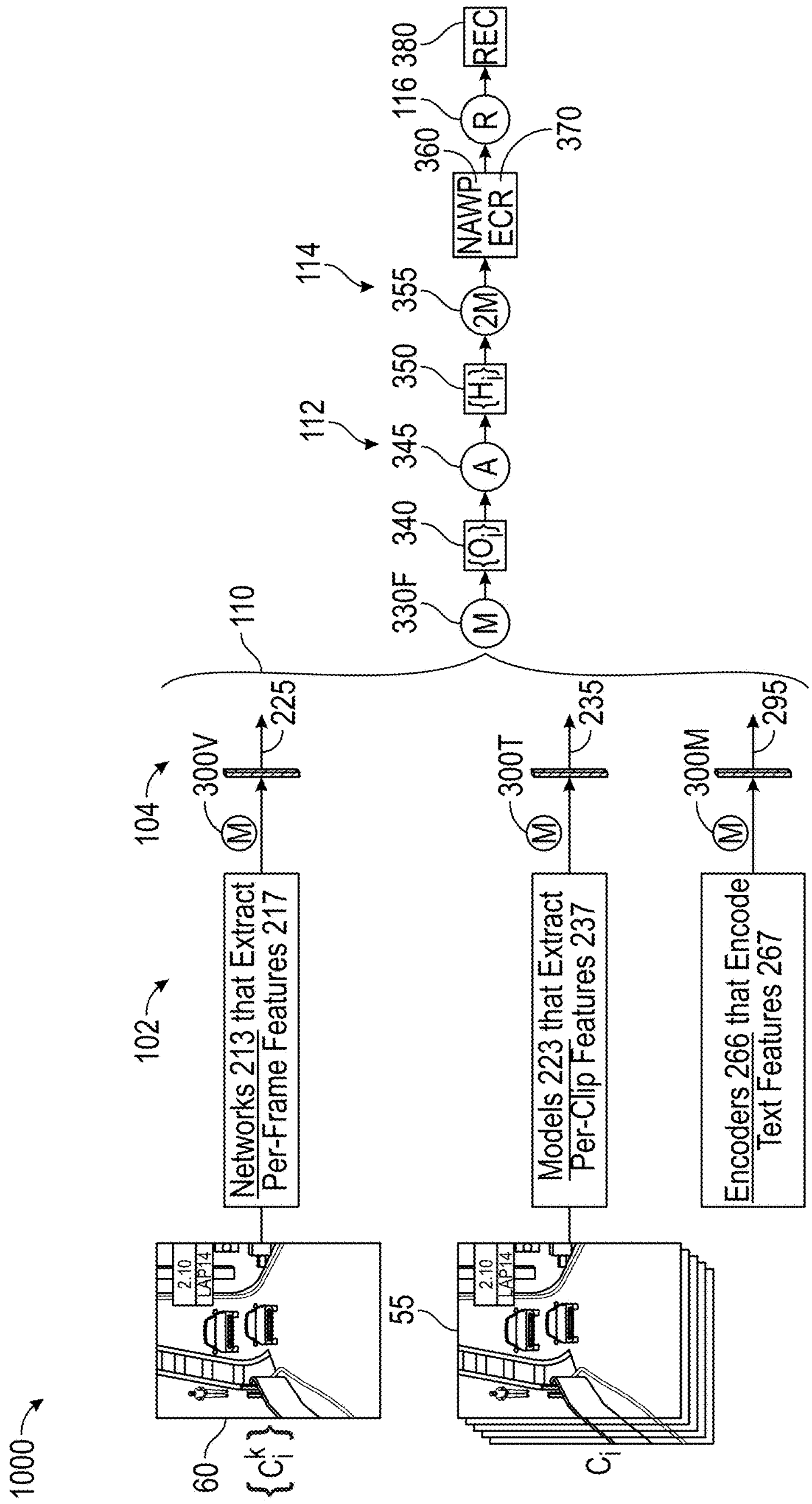
FIG. 3A is a flow diagram of an example network for predicting user engagement.
Figure 4:
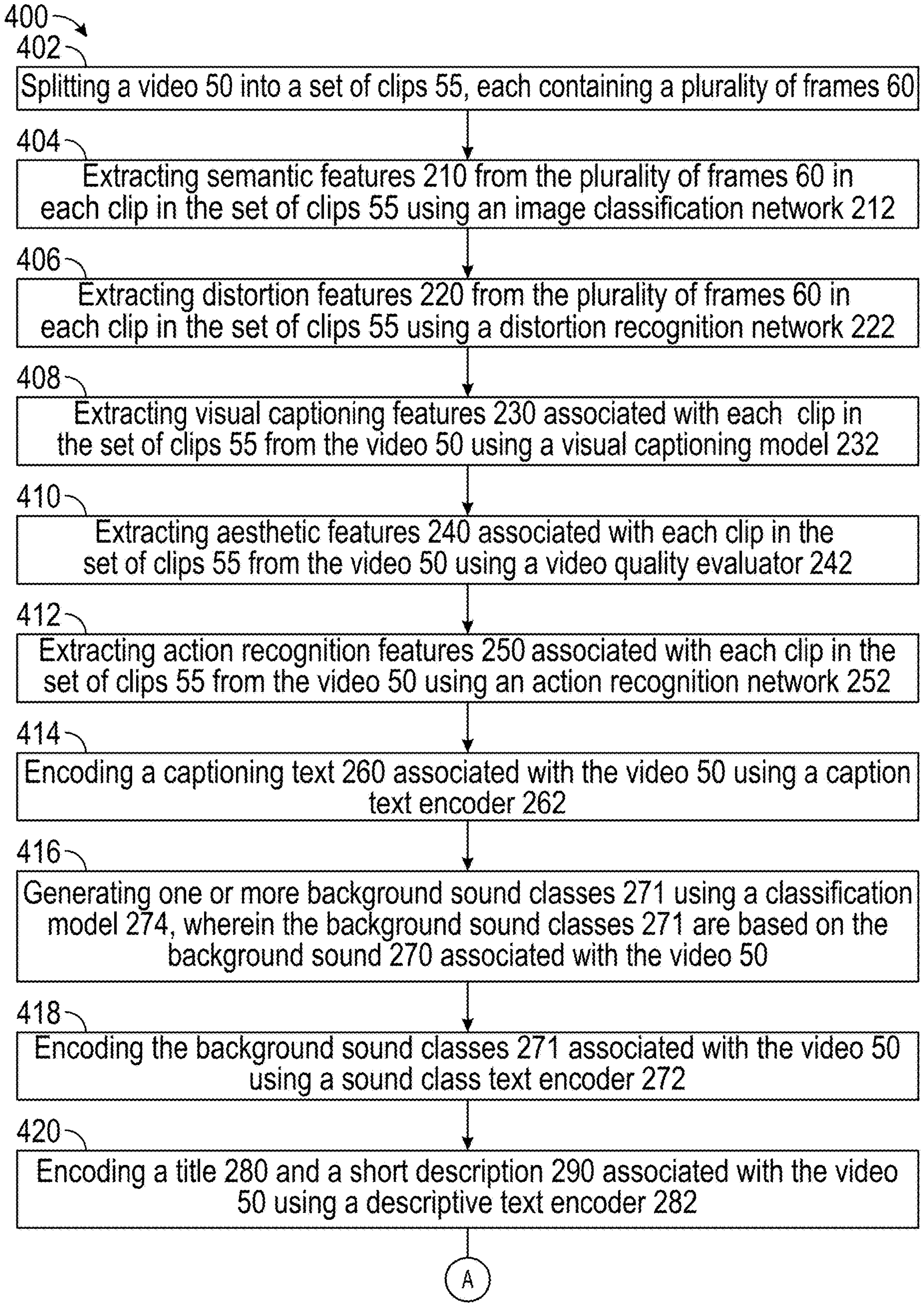
FIG. 4 is a flow chart of process steps performed by an example method of predicting user engagement.
Figure 4:
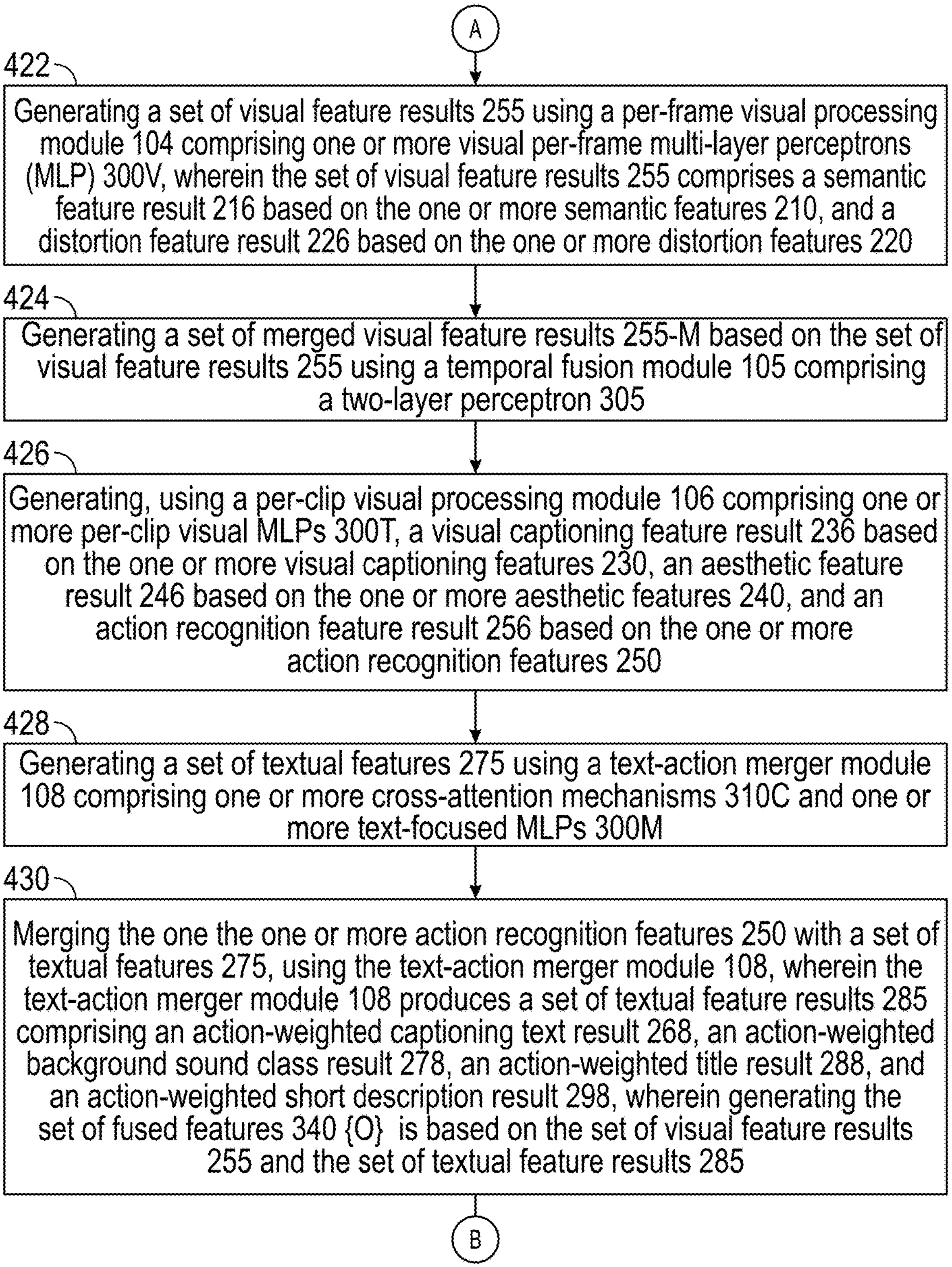
Figure 4:
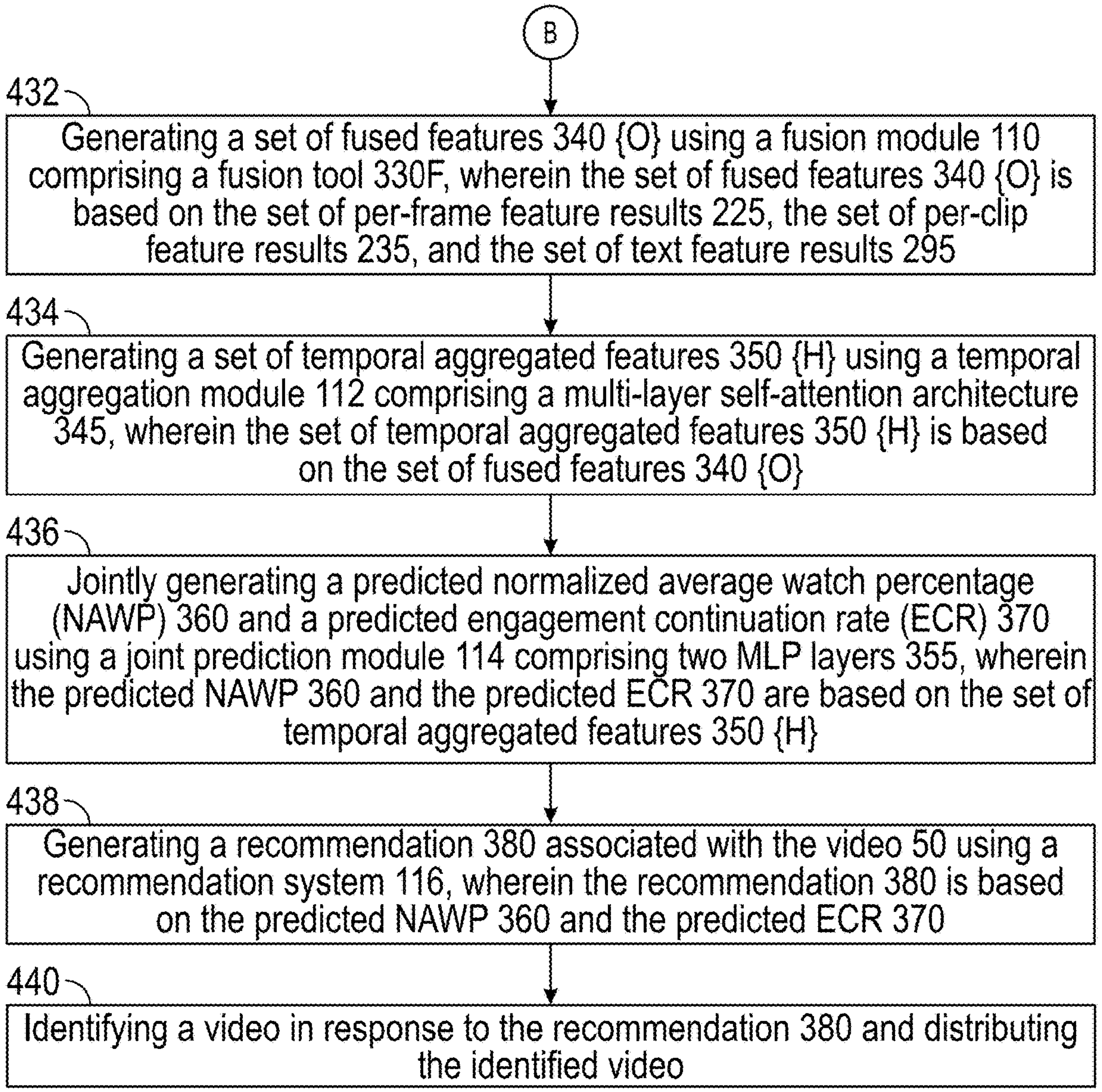

Predicting user engagement for new video content that has not been viewed represents a significant challenge. The network system and methods described herein predict user engagement with short videos by extracting features from the video content itself—independent of view metrics, user reactions, or other external factors. The methodology described herein extracts a plurality of visual and language-based attributes, referred to herein as multi-modal features. As described herein, the network 100 (FIG. 1) generates two new metrics: a Normalized Average Watch Percentage (NAWP) 360 and an Engagement Continuation Rate (ECR) 370 (FIG. 3A, FIG. 4). The predicted NAWP 360 represents a normalization of the average watch percentage metric, providing an indication of the overall engagement level for videos of different durations. The predicted ECR 370 represents the probability that a user watch time will exceed five seconds, providing an indication of the appeal of a video during the first several seconds.

The network 100, in some aspects, is based on a review of the existing video quality assessment (VQA) datasets and the VQA methods of evaluating video quality.

Existing VQA datasets rely on subjective scores collected from relatively small groups of annotators (e.g., forty viewers). Using a small group of annotators introduces a sampling bias into the dataset, especially when the group may not represent the true audience for the content. Many VQA datasets focus on longer videos (e.g., longer than sixty seconds) and on existing content creators, limited categories, and visual features—to the exclusion of background information such as sound, titles, and descriptions.

Because the existing VQA datasets are based on longer videos, the network 100 described herein was developed using a large-scale user-generated short video dataset (referred to herein as "the UGC dataset"). The UGC dataset included about 90,000 short videos, all of which were published and publicly accessible on the Snapchat social media platform. The videos range in duration from ten to sixty seconds. To mitigate sampling bias from lower view numbers, only short videos with views exceeding 2,000 were included. The UGC dataset is notably diverse, encompassing a wide variety of subject matter, including family, food, dining, pets, hobbies, travel, music, and sports.

The review of the existing VQA methods of evaluating video quality included an analysis of existing metrics. Viewer engagement metrics for published videos include view number, like rates, and average watch time (AWT). View numbers are heavily influenced by recommendation systems, leading to potential bias. For example, short videos posted by well-known content creators may receive significantly higher view numbers compared to novice creators. Like rates produce small and indistinguishable values across videos of different types, posing a challenge for effective learning. Average watch time (AWT), while common, has significant limitations when comparing videos of different durations. A similar metric, average watch percentage (AWP) is calculated using the AWT divided by the video duration (d). When the AWT of a video exceeds its duration, the AWP exceeds one, signifying that the video is popular enough to be watched repeatedly. The distributions of AWT and AWP vary significantly based on video duration. Longer videos exhibit a decreasing AWP, suggesting users are less likely to watch a long video. Shorter videos present a unique challenge because users are more likely to watch most or all of a short video. Because AWT and AWP are duration-dependent, those metrics are not good predictors of user engagement for short videos.

Reference now is made in detail to the examples illustrated in the accompanying drawings and discussed below.

The network 100 as described herein generates a new metric called the Normalized Average Watch Percentage (NAWP) 360. The predicted NAWP 360 provides an indication of the overall engagement level for videos of different durations. In one aspect, the NAWP 360 value is not dependent on video duration. Normalization of the average watch time (AWT) may be accomplished by considering the maximum AWT time $f_{max}(d)$ (e.g., associated with the most popular videos) and the minimum AWT $f_{min}(d)$ (e.g., associated with the least popular videos). In one example, the maximum AWT $f_{max}(d)$ can be modeled by linear function (e.g., by analyzing a known subset of AWT values, such as the top three percent) and the minimum AWT $f_{min}(d)$ can be set to zero. Using the maximum and minimum, the Normalized Average Watch Percentage (NAWP) 360 for any video having a duration d (e.g., in seconds) may be derived according to the following equation:

$$NAWP(AWT, d) = \min\left(\frac{AWT - f_{min}(d)}{f_{max}(d) - f_{min}(d)}, 1\right).$$

In some implementations, the NAWP 360 value for the most popular videos (e.g., having an NAWP 360 value in the top three percent) can be set to one. Using the normalization process, the predicted NAWP 360 values fall within a range of zero to one [0,1]—independent of video duration.

The network 100 as described herein also generates a second new metric called the Engagement Continuation Rate (ECR) 370. The predicted ECR 370 represents the probability that a user watch time will exceed five seconds. Users often navigate through or skip uninteresting content. The predicted ECR 370 provides an indication of whether the video content will captivate the interest of viewers beyond the first five seconds. The network 100 in some implementations uses a five-second threshold for the ECR 370 at least in part because a peak in the distribution of average watch time (AWT) occurs before five seconds.

The NAWP 360 and ECR 370 values were calculated using the UGC dataset. Statistical calculations show a robust correlation (e.g., approximately 0.926) between NAWP 360 and ECR 370 for the UGC dataset. In this aspect, videos with a higher probability of a watch time exceeding five seconds tend to exhibit longer average watch times.

Existing recommendation systems typically categorize short videos and analyze user preferences based on each user's history of engagement with various types of video content. Such recommendation systems typically balance exploitation (recommending familiar content and well-known creators) and exploration (recommending new content and novice creators) when determining whether a video will be recommended to users. Consequently, the preference distribution for a short video will vary depending on the exploitation strategy employed by the recommendation system, resulting in a bias.

FIG. 1 depicts a network 100 in accordance with one example for predicting user engagement and generating recommendations associated with un-viewed videos. The illustrated network 100 includes a series of modules—an extraction module 102, a per-frame visual processing module 104, a temporal fusion module 105, a per-clip visual processing module 106, a text-action merger module 108, a fusion module 110, a temporal aggregation module 112, a joint prediction module 114, and a recommendation system 116.

The extraction module 102 includes one or more visual quality feature extractors for extracting visual quality features—including semantic features 210, distortion features 220, and action recognition features 250, one or more visual understanding feature extractors for extracting visual understanding features—including visual captioning features 230 and aesthetic features 240, one or more textual feature processors for extracting and analyzing the textual features—including the captioning text 260, the background sound classes 270, the title 280, and the short description 290, as described herein.

The per-frame visual processing module 104 in some implementations includes one or more per-frame visual processors for analyzing and refining per-frame visual features—including semantic features 210 and distortion features 220, as described herein.

The per-clip visual processing module 106 in some implementations includes one or more per-clip visual processors for analyzing and refining per-clip visual features—including action recognition features 250, visual captioning features 230 and aesthetic features 240, as described herein.

Further details regarding aspects of the modules in the network 100 are described herein.

The network 100 as described herein formulates engagement prediction for short videos as a realistic conditional problem. For a given short video (v) and a recommendation system (R), the network 100 (G) as described herein predicts the normalized average watch percentage $$\widehat{\text{NAWP}}$$

and the engagement continuation rate $$\widehat{\text{ECR}}$$

as follows:

$$(\widehat{\text{NAWP}}, \widehat{\text{ECR}}) = G(v \mid R)$$

Figure 2:
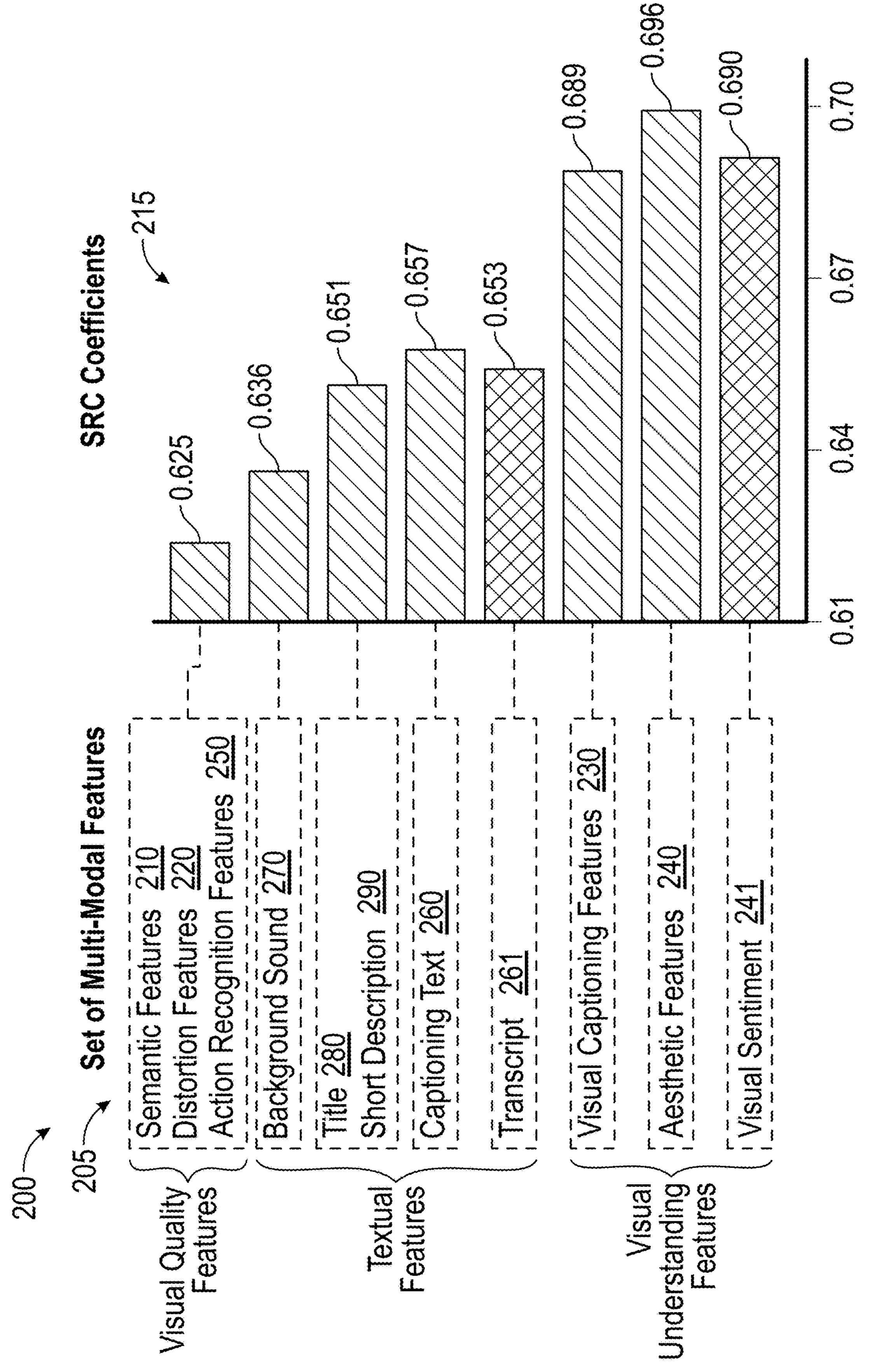
FIG. 2 is a diagram illustrating the incremental performance achieved by a set of multi-modal features.

FIG. 2 is a diagram 200 illustrating the incremental performance of the Spearman Rank Correlation Coefficient (SRCC) 215 achieved by gradually incorporating each multi-modal feature. The network 100, in some aspects, is based on an investigation of a comprehensive set 205 of multi-modal features. Each feature in the set 205 is evaluated using the SRCC of the Normalized Average Watch Percentage (NAWP) 360 as described herein.

The analysis of the set 205 of multi-modal features in some implementations builds upon existing Video Quality Assessment (VQA) methods, such as the Universal Video Quality (UVQ) model and the MD-VQA model. VQA methods analyze video signals and quality using mathematical models. The quality of video signals, especially digital video signals, can be approximated using data contained in the signal, such as peak signal-to-noise ratio. Digital video comprises a series of digital images, displayed in rapid succession. The image in each frame includes a formation of pixels; each pixel includes data. Video quality metrics work best on professionally generated content (e.g., feature films) because the metrics assume the video quality is pristine. User-generated content is not pristine. UCG videos include distortions, compression artifacts, and distortions. The UVQ model uses subnetworks to analyze video quality and generate a diagnostic report that includes a content description (e.g., text strings such as "video game" or "motorsports"), a distortion analysis (e.g., jitter, lens blur, pixelated), and a compression level (e.g., 0.559 or "medium-high" compression).

The set 205 of multi-modal features shown in FIG. 2 in some implementations includes visual quality features, textual features, and visual understanding features.

The analysis of the set 205 of multi-modal features in some implementations uses video quality models to extract visual quality features—including per-frame semantic features 210, per-frame distortion features 220, and per-clip action recognition features 250. Although most VQA methods have serious shortcomings, as described herein, these three visual quality features 210, 220, 250 collectively represent a fundamental, general assessment of content and objective quality. As shown in FIG. 2, the analysis of these three visual quality features 210, 220, 250 produces a baseline Spearman Rank Correlation Coefficient (SRCC) value of 0.625.

The next group of features in the set 205 in some implementations includes textual features (e.g., values presented as text). In some implementations, a text encoder such as T5 is used to encode the text-based data. Background sound 270 includes features, such as background music, which are incorporated into short videos to enhance the atmosphere and attract viewers. In some implementations, a classification model such as YAMNet is used to classify the detected background sounds in a video. YAMNet is a 521-class audio event classification model. The analysis includes identifying the top five classification results, presented as text, which are then used as an additional network input to augment the modeling of video engagement. As shown in FIG. 2, the analysis of the background sound 270 improves the SRCC value from the baseline value of 0.625 to 0.636.

Other textual features include title 280 and short description 290. Many short videos include a title to emphasize key content and a short description to provide additional context or information. In some implementations, a text encoder such as T5 is used to encode the text-based title 280 and short description 290. As shown in FIG. 2, the analysis of the title 280 and short description 290, together, improves the SRCC value from 0.636 to 0.651.

Another textual feature includes video captioning text 260 (e.g., the text layer associated with the video captioning data). Video captioning, when present, may provide a fine-grained understanding of the content of a short video. Video captioning generally includes a text layer and a visual layer. In some implementations, an extraction tool (e.g., mPLUG-2) is used to extract mid-layer features and captions from a video. As shown in FIG. 2, the analysis of the captioning text 260 improves the SRCC value from 0.651 to 0.657.

Another textual feature includes the transcript 261 of all or most of the spoken content in a video. Intuitively, a transcript might facilitate a better understanding of the video content. However, the analysis indicates that adding the transcript 261 does not yield an improvement in the SRCC value. As shown in FIG. 2, the analysis of the transcript 261 causes a decrease in the SRCC value from 0.657 to 0.653. One of more factors may impact the desirability of including the transcript 261 in the analysis. For example, only about thirty percent of short videos include effective transcripts. Also, many viewers decide whether to continue watching during the first few seconds, during which only the initial, relatively short portion of a transcript would have an impact on the viewer. The network 100, in some implementations, does not include an analysis of the transcript 261.

The textual features described above are typically referred to as semantic features because they include representations in text format (e.g., single words, phrases, strings, or sentences).

The next group of features in the set 205 in some implementations includes visual understanding features, such as visual captioning features 230, aesthetic features 240, and visual sentiment 241.

The visual layer associated with video captioning data can provide insights into video popularity. Whereas the analysis of the captioning text 260 improved the SRCC value slightly (from 0.651 to 0.657), the analysis of the visual captioning features 230 improved the SRCC value significantly from 0.657 to 0.689.

As shown in FIG. 2, the analysis of aesthetic features 240 caused an increase in the SRCC value from 0.689 to 0.696.

Another visual understanding feature is referred to as visual sentiment 241. In some implementations, a weakly supervised, coupled network tool (e.g., WSCNet) is used to extract intermediate features that represent visual sentiment 241. As shown in FIG. 2, the analysis of visual sentiment 241 causes a decrease in the SRCC value from 0.696 down to 0.690, suggesting a limited correlation between visual sentiment 241 and user engagement. The network 100, in some implementations, does not include an analysis of visual sentiment 241.

Referring back to FIG. 1, the extraction module 102 in some implementations includes textual feature processors, such as classification networks, quality analysis models, encoders, and similar tools for extracting the features from a video.

The per-frame visual processing module 104 in some implementations, as described herein, includes per-frame visual processors, such as one or more machine-learning models (e.g., deep-learning neural networks, MLPs) for analyzing the extracted per-frame visual features (e.g., semantic features, distortion features) and generate a set of refined features. In some implementations, the results generated by the per-frame visual processing module 104 are merged together using a temporal fusion module 105, as described herein.

The per-clip visual processing module 106 in some implementations, as described herein, includes per-clip visual processors, such as one or more machine-learning models for analyzing the extracted per-clip features (e.g., visual captioning features, aesthetic, motion or action features) and generate a set of results.

In some implementations, a text-action merger module 108 uses one or more machine-learning models and cross-attention mechanisms to merge one or more of the extracted visual features (e.g., the action recognition features) with one or more of the extracted textual features (e.g., captioning text, sound classes, titles, and short descriptions), as described herein, to generate a set of merged or weighted results.

The results generated by the network 100 in some implementations are combined or fused using a fusion module 110 that includes one more fusion tools to generate a set of fused features $\{O_i\}$.

The temporal aggregation module 112 in some implementations, as described herein, uses an eight-layer self-attention architecture to obtain a set of temporal aggregated features $\{H_i\}$.

The joint prediction module 114 in some implementations, as described herein, uses two branches (consisting of MLP layers) to jointly predict a predicted normalized action watch percentage (NAWP) 360 and a predicted engagement continuation rate (ECR) 370 based on the set of temporal aggregated features 350 {H}.

In use, a recommendation system 116 may be configured to use the predicted NAWP 360 and predicted ECR 370 to generate a recommendation 380 associated with the video. The recommendation system 116 may include a server that identifies other videos in accordance with the recommendation 380 and distributes each identified video through a network for delivery to consumers of video (e.g., via an application on a user's mobile device).

FIG. 3A is a flow diagram of an example 1000 of the network 100 for predicting user engagement.

Given a video 50 with frame count M and frame rate r, the network 100 in some implementations creates a quantity $$\frac{M}{L} \text{ of clips 55 } \{C_i\}_{i=1}^{M/L}$$

wherein each clip 55 $C_i$ contains a plurality L of frames $$60\{C_i^k\}_{k=1}^{L}.$$

The extraction module 102 in some implementations includes feature extractors, such as one or more networks 213, one or more models 223, and one or more encoders 266. The networks 213 extract one or more per-frame visual features 217 associated with one or more of the plurality of frames 60 in each clip in the set of clips 55. The models 223 extract one or more per-clip visual features 237 associated with each clip. The encoders 266 encode one or more text features 267 associated with the video 50 as a whole.

The per-frame visual processing module 104 in some implementations includes one or more per-frame visual processors for analyzing and refining per-frame visual features—including semantic features 210, distortion features 220, as described herein.

The per-frame visual MLPs 300V generate a set of per-frame feature results 225. The per-clip visual MLPs 300T generate a set of per-clip feature results 235. The text-focused MLPs 300M generate a set of text feature results 295.

The results 225, 235, 295 in some implementations are combined or fused using a fusion module 110 that includes one more fusion tools 330F to generate a set of fused features 340 $\{O_i\}$.

The temporal aggregation module 112 in some implementations, as described herein, uses an eight-layer self-attention architecture 345 (denoted as A in FIG. 3A) to obtain a set of temporal aggregated features 350 $\{H_i\}$.

The joint prediction module 114 in some implementations, as described herein, uses two layers of a MLP 355 (2M) to jointly generate a predicted normalized action watch percentage (NAWP) 360 and a predicted engagement continuation rate (ECR) 370 based on the set of temporal aggregated features 350 $\{H_i\}$.

The recommendation system 116 (R) in some implementations uses the predicted NAWP 360 and the predicted ECR 370 to generate a recommendation 380 (REC) associated with the video. The recommendation system 116 may include a server that identifies other videos in accordance with the recommendation 380 and distributes the each identified video through a network for delivery to viewers of video (e.g., via a social media application on the viewer's mobile device).

Figure 3B:
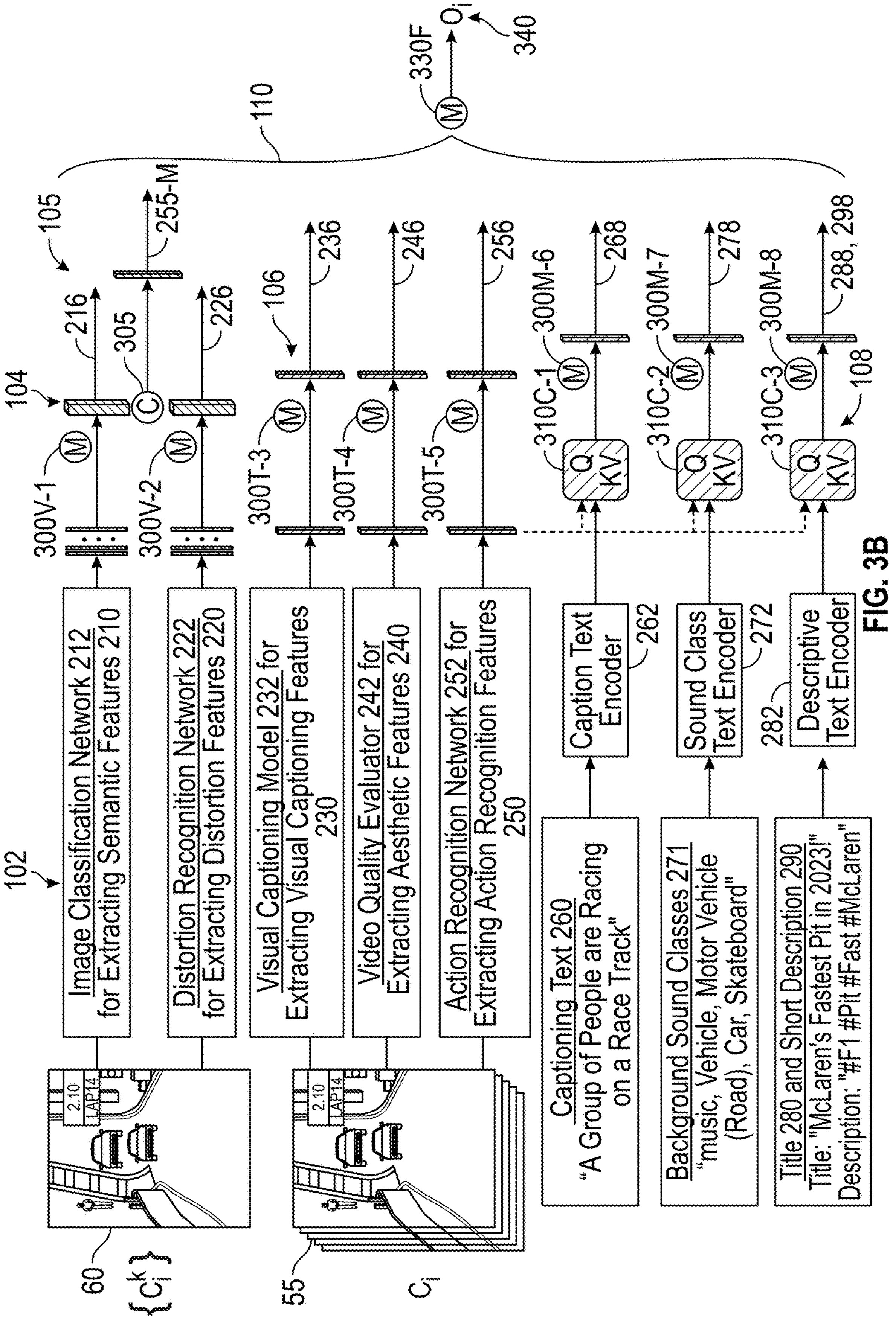
FIG. 3B is a flow diagram of an example extraction module, visual processing module, and fusion module in a network for predicting user engagement.

FIG. 3B is a flow diagram of an example extraction module 102, a per-frame visual processing module 104, and a fusion module 110 in a network 100 for predicting user engagement.

One or more of the modules shown and described herein may be performed simultaneously, in a series, in an order other than shown and described, or in conjunction with additional modules. Some modules may be omitted or, in some applications, repeated. In some example implementations, the addition of modules results in better performance, but with an increase in computation cost. In some implementations, a minimal system including only an image classification network and a distortion recognition network produces satisfactory results and an easier deployment in real-world scenarios.

In some implementations, for each clip 55, the extraction module 102 extracts the semantic features 210 and the distortion features 220 from each of the frames 60, denoted as $$C_i^k.$$

In some implementations, the entire clip 55 is used by the extraction module 102 for extracting visual captioning features 230, aesthetic features 240 and action recognition features 250. The textual features—including the captioning text 260, the background sound classes 271, the title 280, and the short description 290—are shared among all the clips 55 in the video 50.

The extraction module 102 in some implementations, as shown in FIG. 3A, includes one or more networks 213 for extracting one or more per-frame features 217 associated with one or more of the plurality of frames 60 in each clip in the set of clips 55. As shown in FIG. 3B, the per-frame features 217 in some implementations include one or more semantic features 210 and one or more distortion features 220. The networks 213 for extracting per-frame features 217 in some implementations includes an image classification network 212 for extracting the one or more semantic features 210 and a distortion recognition network 222 for extracting the one or more distortion features 220. In some implementations, the set of per-frame feature results 225 generated by the per-frame visual processing module 104 comprises a semantic feature result 216 based on the one or more semantic features 210 and a distortion feature result 226 based on the one or more distortion features 220.

As shown in FIG. 3B, an image classification network 212 in some implementations is used for extracting one or more semantic features 210 associated with one or more of the plurality of frames 60 in each clip in the set of clips 55. In some implementations, the image classification network 212 uses a convolutional neural network model and scaling method that uniformly scales all dimensions of depth/width/resolution using a compound coefficient (e.g., EfficientNet) which has been pre-trained using an image database such as ImageNet.

Although specific models are mentioned in the context of various elements of the extraction module 102, the techniques and systems described herein may use any of a variety of suitable classification networks, quality analysis models, encoders, and similar tools for extracting features, both visual and text-based, from a video.

A distortion recognition network 222 in some implementations is used for extracting one or more distortion features 220 associated with one or more of the plurality of frames 60 in each clip in the set of clips 55. In some implementations, the distortion recognition network 222 uses a subnetwork such as DistortionNet, which is part of the Universal Video Quality (UVQ) model. The distortion recognition network 222 in some implementations is trained using artificially distorted image quality assessment datasets (e.g., the Konstanz Artificially Distorted Image quality Set (KADIS-700k) and the Konstanz Artificially Distorted Image quality Database (KADID-10k)).

The extraction module 102 in some implementations, as shown in FIG. 3A, includes one or more models 223 for extracting one or more per-clip features 237 associated with each clip in the set of clips 55. As shown in FIG. 3B, the per-clip features 237 in some implementations include one or more visual captioning features 230, one or more aesthetic features 240, and one or more action recognition features 250. The models 223 in some implementations include a visual captioning model 232 for extracting the one or more visual captioning features 230, a video quality evaluator 242 for extracting the one or more aesthetic features 240, and an action recognition network 252 for extracting the one or more action recognition features 250. In some implementations, the set of text per-clip feature results 235 generated by the per-clip visual processing module 106 includes a visual captioning feature result 236 based on the one or more visual captioning features 230, an aesthetic feature result 246 based on the one or more aesthetic features 240, and an action recognition feature result 256 based on the one or more action recognition features 250.

A visual captioning model 232 in some implementation is used for extracting one or more visual captioning features 230 associated with each clip in the set of clips 55. In some implementations, the visual captioning model 232 uses a modularized, pre-trained extraction tool (e.g., mPLUG-2).

A video quality evaluator 242 in some implementation is used for extracting one or more aesthetic features 240 associated with each clip in the set of clips 55. In some implementations, the video quality evaluator 242 uses a pre-trained disentangled objective video quality evaluator (such as DOVER).

An action recognition network 252 in some implementation is used for extracting one or more action recognition features 250 associated with each clip in the set of clips 55. In some implementations, the action recognition network 252 uses a residual neural network (such as ResNet-3D) which has been pre-trained on a large-scale video dataset with human action classes (such as Kinetics-400).

The extraction module 102 in some implementations, as shown in FIG. 3A, includes one or more encoders 266 for encoding one or more text features 267 associated with each video 50. As shown in FIG. 3B, the text features 267 in some implementations include a captioning text 260, one or more background sound classes 271, a title 280, and a short description 290. The encoders 266 in some implementations include a caption text encoder 262 for encoding the captioning text 260, a sound class text encoder 272 for encoding the one or more background sound classes 271, and a descriptive text encoder 282 for encoding the title 280 and the short description 290.

A caption text encoder 262 in some implementations is used for encoding a captioning text 260 associated with the video 50. In some implementations, the caption text encoder 262 uses encoder-decoder transformers that are pre-trained on a multi-task mixture of unsupervised and supervised tasks, in which each task is converted into a text-to-text format, such as the T5 models.

A sound class text encoder 272 in some implementation is used for encoding one or more background sound classes 271 associated with the video 50. In some implementations, the sound class text encoder 272 uses encoder-decoder transformers such as the T5 models. In some implementations, a classification model is used for generating the one or more background sound classes 271 which are based on the background sound 270 associated with a video 50. In some implementations, the classification model uses a pre-trained deep neural network such as YAMNet for extracting the background sound 270, categorizing the sound 270 into a plurality of audio events in the video, and generating results that include one or more background sound classes 271. The classification model in some implementations identifies the top five classification results, presented as text strings.

A descriptive text encoder 282 in some implementation is used for encoding a title 280 and a short description 290 associated with the video 50. In some implementations, the descriptive text encoder 282 uses encoder-decoder transformers such as the T5 models. For improved processing, descriptive text encoder 282 in some implementations uses the T5 models together with cross-attention to handle these elements 280, 290 separately. Some videos may have an empty title or an empty short description, or both. The descriptive text encoder 282 in some implementations considers empty or null fields as valid inputs.

The network 100 in some implementations uses a per-frame visual processing module 104 to analyze the extracted visual features, including the semantic features 210 and the distortion features 220. The per-frame visual processing module 104 (and the other modules described herein) are shown in FIG. 1 and in FIG. 3A, and are described in the example process steps outlined in FIG. 4. The per-frame visual processing module 104 in some implementations includes one or more per-frame visual MLPs 300V-1, 300V-2 for generating a set of visual feature results 255. The set of visual feature results 255 (and other sets described herein) are described in the example process steps outlined in FIG. 4.

An MLP is a deep-learning neural network consisting of fully connected neurons with linear or non-linear activation functions, organized in layers. The neurons are fully connected, which means that each node in each layer connects to every node in the following layer. Each layer connection may be associated with a certain value called a connection weight. Learning occurs in the MLP by changing the connection weights after each piece of data is processed, based on the amount of error in the output, compared to the expected result. This process is known as supervised learning with back-propagation. The loss or error in each output node can be calculated using a loss function. The node weights can be adjusted based on corrections that minimize the error, using an error function or loss function. The incremental adjustments in each node weight can be calculated using derivative mathematics.

In some implementations, a first per-frame visual MLP 300V-1 generates a semantic feature result 216 based on the one or more semantic features 210; a second per-frame visual MLP 300V-2 generates a distortion feature result 226 based on the one or more distortion features 220. The semantic feature result 216 and the distortion feature result 226, together, are referred to herein as a set of visual feature results 255.

In some implementations, the set of visual feature results 255 generated by the per-frame visual processing module 104 are merged together using a temporal fusion module 105, as described herein, to generate a set of merged feature results 255-M. The temporal fusion module 105 in some implementations includes a two-layer perceptron 305. For per-frame feature extraction, in some implementations, the semantic features 210 ($S_i$) and the distortion features 220 ($D_i$) have the dimensions $\mathbb{R}^{1\times L\times 512}$. The temporal fusion module 105, in some implementations, re-shapes the per-frame features 210, 220 into two subsets, which may be expressed as:

$$S_i^r \in \mathbb{R}^{1\times(512\times L)} \text{ and } D_i^r \in \mathbb{R}^{1\times(512\times L)}$$

Subsequently, a two-layer MLP 305 merges these two subsets to generate a set of merged feature results 255-M, which may be expressed as:

$$M_i = \omega(S_i^r, D_i^r)$$

where ω denotes the two layer MLP 305 and $M_i \in \mathbb{R}^{1\times1024}$ represents the temporally merged set of feature results 255-M.

The network 100 in some implementations uses a per-clip visual processing module 106 to analyze the extracted per-clip visual features, including the one or more visual captioning features 230, the one or more aesthetic features 240, and the one or more action recognition features 250. As illustrated in FIG. 3B, per-clip visual processing module 106 in some implementations includes one or more per-clip visual MLPs 300T-3, 300T-4, 300T-5.

In some implementations, a per-clip visual MLP 300T-3 generates a visual captioning feature result 236 based on the one or more visual captioning features 230. Another per-clip visual MLP 300T-4 generates an aesthetic feature result 246 based on the one or more aesthetic features 240. Another per-clip visual MLP 300T-5 generates an action recognition feature result 256.

In some implementations, the network 100 includes a text-action merger module 108 for merging the one or more action recognition features 250 (before processing by per-clip visual MLP 300T-5) with a set of textual features 275. The text-action merger module 108 generates the set of textual features strings 275, which are based on the encoded captioning text 260, the encoded background sound classes 271, the encoded title 280, and the encoded short description 290.

As illustrated in FIG. 3B, the text-action merger module 108 in some implementations includes one or more cross-attention mechanisms 310C-1, 310C-2, 310C-3 and one or more text-focused MLPs 300M-6, 300M-7, 300M-8. Attention refers to machine-learning models that determine the relative importance or "weight" associated with each component in sequence, relative to other components in the sequence. The model computes attention weights during processing. The cross-attention mechanisms 310C-1, 310C-2, 310C-3 in FIG. 3B are illustrated using the matrix Q and the matrices K and V. In general, the matrix Q contains a number of queries, while matrices K and V jointly contain an un-ordered set of key-value pairs. QKV attention mechanisms can be applied for self-attention or for cross-attention. The outputs of the attention layer are concatenated and passed into a neural network for further processing.

The text-action merger module 108 in some implementations uses a first cross-attention mechanism 310C-1 to merge the one or more action recognition features 250 with a text string associated with the encoded captioning text. A text-focused MLP 300M-6 is then used to generate an action-weighted captioning text result 268.

A second cross-attention mechanism 310C-2 is used, in some implementations, to merge the one or more action recognition features 250 with a text string associated with encoded background sound classes. A text-focused MLP 300M-7 is then used to generate an action-weighted background sound class result 278.

Similarly, a third cross-attention mechanism 310C-3 is used, in some implementations, to merge the one or more action recognition features 250 with a text string associated with the encoded title and with the encoded short description. A text-focused MLP 300M-8 is then used to generate an action-weighted title result 288 and an action-weighted short description result 298.

The results 268, 278, 288, 298 are referred to as action-weighted because the process of merging the action recognition features 250 introduces a relative importance or weight to each result, based on the extracted action features.

The results generated by the network 100 in some implementations are combined or fused using a fusion module 110 that includes one more fusion tools 330F to generate a set of fused features 340 $\{O_i\}$. The fusion module 110 in some implementations generates the set of fused features 340 {O} based on the set of visual feature results 255 (e.g., the semantic feature results 216 the distortion feature results 226) or the set of merged feature results 225-M), the visual captioning feature result 236, the aesthetic feature result 246, the action recognition feature result 256, the action-weighted captioning text result 268, the action-weighed background sound class result 278, the action-weighted title result 288, and the action-weighted short description result 298.

The set of fused features 340 is associated with each of the clips $$\{C_i\}_{i=1}^{M/L}$$

in the video 50. The fusion module 110 in some implementations combines or fuses the results associated with all eight multi-modal features, using eight MLP layers to obtain the set of the fused features 340

$$\{O_i\}_{i=1}^{M/L}.$$

The temporal aggregation module 112 (FIG. 3A) in some implementations, uses an eight-layer self-attention architecture 345 (denoted as A in FIG. 3A) to combine the set of the fused features 340

$$\{O_i\}_{i=1}^{M/L}$$

and obtain a set of temporal aggregated features 350

$$\{H_i\}_{i=1}^{M/L}.$$

The eight-layer self-attention architecture 345, in some implementations, includes the modules 102, 104, 105, 106, and 108, as shown in FIG. 3B and described herein.

The joint prediction module 114 (FIG. 3A) in some implementations, as described herein, uses two layers of a MLP 255 (denoted as 2M in FIG. 3A) to jointly predict a predicted normalized action watch percentage (NAWP) 360 and a predicted engagement continuation rate (ECR) 370 based on the set of temporal aggregated features 350 {H}. The network 100 in some implementations utilizes two MLP layers 355 referred to as $$F_{out}^1, F_{out}^2$$

to jointly predict $\widehat{NAWP}$ and $\widehat{ECR}$:

$$\widehat{NAWP} = \frac{L}{M}\sum_{i=1}^{\frac{M}{L}} F_{out}^{1}(H_i);\ \widehat{ECR} = \frac{L}{5r}\sum_{i=1}^{\frac{5r}{L}} F_{out}^{2}(H_i)$$

where the predicted $\widehat{ECR}$ is derived from frames within an initial period (e.g., the first five seconds of the video 50).

The joint training loss L for $$\widehat{NAWP} \text{ and } \widehat{ECR}$$

is derived:

$$L = \|NAWP - \widehat{NAWP}\|_2 + \|ECR - \widehat{ECR}\|_2$$

Joint training produced an enhanced overall performance compared to separate training.

The predicted NAWP 360 in some implementations falls within the range of zero to one [0,1]. The predominant concentration of predicted ECR 370 in some implementations falls within the range of zero to 0.82 [0, 0.82]. The distribution of ECR 370 values is bimodal; peaking at approximately 0.1 and 0.7. The bimodal distribution suggests that users either swipe past or skip an unengaging video rather quickly, whereas users tend to dedicate a relatively longer time to more engaging video content. An analysis of videos in different categories showed that ECR values fall into similar ranges, indicating that user browsing behavior is similar across various categories.

The predicted NAWP 360 offers several advantages over other video quality evaluation models. Using NAWP effectively measures the engagement levels of videos across varying durations. Utilizing NAWP as the training metric enhances performance for videos in each duration segment, consequently improving overall model performance. NAWP enables a fair comparison of any two videos, regardless of duration. The real NAWP can serve as an accurate indicator for generalized ranking within a recommendation system. When selecting the top 10% of videos based on NAWP, the resulting distribution of durations is even. In contrast, the average watch time (AWT) and average watch percentage (AWP) produce biased results, especially when selecting videos of varying durations.

The recommendation system 116 (denoted as R in FIG. 3A) may be configured to use the predicted NAWP 360 and predicted ECR 370 to generate a recommendation 380 (REC) associated with the video 50. The recommendation system 116 may include a server that identifies other videos in accordance with the recommendation 380 and distributes each identified video through a network for delivery to consumers of video (e.g., via an application on the user's mobile device or other platform).

The network 100 in some implementations was trained using the UGC dataset. As described herein, the UGC was created because the existing VQA datasets were not well suited for analyzing short videos.

For training the network 100, the UGC dataset was split, using 90% for training and 10% for testing. The visual features were down sampled to C×1×1 to optimize computational costs and save storage. The network 100 takes the extracted features described herein as input and regresses $$\widehat{NAWP} \text{ and } \widehat{ECR}.$$

The models, networks, evaluators, and encoders used in the extraction module 102 were pre-trained separately, using the default parameters defined by their respective authors.

The network 100 in some implementations was trained using a batch size of eight for 70,000 iterations. The training in some implementations was improved using an optimizer such as Adam. The learning rate is decreased from $1\times10^{-4}$ to $1\times10^{-7}$ according to a cosine annealing strategy. The parameter L is set to be 16. The training optimizes $$\widehat{NAWP} \text{ and } \widehat{ECR}$$

according to the joint training loss L:

$$L = \|NAWP - \widehat{NAWP}\|_2 + \|ECR - \widehat{ECR}\|_2$$

The flow diagrams shown in FIG. 3A and FIG. 3B may be further understood with reference to a flow chart 400 in FIG. 4 that includes a list of example process steps.

FIG. 4 is a flow chart 400 of steps performed by an example method of predicting user engagement using the modules, processes, and techniques described herein. Although the process steps are described in the context of predicting user engagement, other uses and implementations of the steps described, for other types of systems, will be understood by one of skill in the art from the description herein. One or more of the process steps shown and described may be performed simultaneously, in a series, in an order other than shown and described, or in conjunction with additional steps. Some process steps may be omitted or, in some applications, repeated.

At block 402, the network 100 performs the example step of splitting a video 50 into a set of clips 55, each containing a plurality of frames 60. Given a video 50 with frame count M and frame rate r, the network 100 in some implementations splits the video 50 into a quantity $$\frac{M}{L}$$

of clips $$55\{C_i\}_{i=1}^{M/L}$$

wherein each clip 55 $C_i$ contains a plurality L of frames $$60\{C_i^k\}_{k=1}^{L}.$$

In some implementations, for each clip 55, the extraction module 102 extracts the semantic features 210 and the distortion features 220 from each of the frames 60, denoted as $$C_i^k.$$

In some implementations, the entire clip 55 is used by the extraction module 102 for extracting visual captioning features 230, aesthetic features 240 and action recognition features 250. The text data, including the captioning text 260, the background sound classes 271, the title 280, and the short description 290 are shared among all the clips 55 in the video 50.

At block 404, the network 100 performs the example step of extracting one or more semantic features 210 from one or more of the plurality of frames 60 in each clip in the set of clips 55 using an image classification network 212. In some implementations, the image classification network 212 uses a neural network model such as EfficientNet which has been pre-trained using an image database such as ImageNet.

Although specific models are mentioned in the context of various elements of the extraction module 102, the techniques and systems described herein may use any of a variety of suitable classification networks, quality analysis models, encoders, and similar tools for extracting features, both visual and text-based, from a video.

At block 406, the network 100 performs the example step of extracting one or more distortion features 220 from one or more of the plurality of frames 60 in each clip in the set of clips 55 using a distortion recognition network 222. In some implementations, the distortion recognition network 222 uses a subnetwork such as DistortionNet, which is part of the Universal Video Quality (UVQ) model. The distortion recognition network 222 in some implementations is trained using artificially distorted datasets such as KADIS-700k and KADID-10k.

At block 408, the network 100 performs the example step of extracting one or more visual captioning features 230 associated with each clip in the set of clips 55 using a visual captioning model 232. In some implementations, the visual captioning model 232 uses a modularized, pre-trained extraction tool (e.g., mPLUG-2).

At block 410, the network 100 performs the example step of extracting one or more aesthetic features 240 associated with each clip in the set of clips 55 using a video quality evaluator 242. In some implementations, the video quality evaluator 242 uses a pre-trained quality evaluator such as DOVER.

At block 412, the network 100 performs the example step of extracting one or more action recognition features 250 associated with each clip in the set of clips 55 using an action recognition network 252. In some implementations, the action recognition network 252 uses a residual neural network such as ResNet-3D which has been pre-trained on a large-scale video dataset with human action classes such as Kinetics-400.

At block 414, the network 100 performs the example step of encoding a captioning text 260 associated with the video 50 using a caption text encoder 262. In some implementations, the caption text encoder 262 uses a series of encoder-decoder transformers such as the T5 models, which are pre-trained on a massive dataset of text and code.

At block 416, the network 100 performs the example step of generating the one or more background sound classes 271 using a classification model, wherein the one or more background sound classes 271 is based on the background sound 270 associated with the video 50. In some implementations, the classification model uses a pre-trained deep neural network such as YAMNet for extracting the background sound 270, categorizing the sound 270 into a plurality of audio events in the video, and generating results that include one or more background sound classes 271. The classification model in some implementations identifies the top five classification results, presented as text strings.

At block 418, the network 100 performs the example step of encoding one or more background sound classes 271 associated with the video 50 using a sound class text encoder 272.

At block 420, the network 100 performs the example step of encoding a title 280 and a short description 290 associated with the video 50 using a descriptive text encoder 282. In some implementations, the descriptive text encoder 282 uses the T5 models. For processing the title 280 and the short description 290, the network 100 in some implementations uses the T5 models along with cross-attention to handle these elements 280, 290 separately. Some videos may have an empty title or an empty short description, or both. The descriptive text encoder 282 in some implementations considers empty or null fields as valid inputs.

At block 422. the network 100 performs the example step of generating a set of per-frame visual feature results 255 using a per-frame visual processing module 104 comprising one or more per-frame visual MLPs 300V, wherein the set of visual feature results 255 comprises a semantic feature result 216 based on the one or more semantic features 210, and a distortion feature result 226 based on the one or more distortion features 220. As illustrated in FIG. 3B, the per-frame visual processing module 104 in some implementations includes one or more per-frame visual MLPs 300V-1, 300V-2 for generating a set of visual feature results 255. In some implementations, a first per-frame visual MLP 300V-1 generates a semantic feature result 216 based on the one or more semantic features 210; a second per-frame visual MLP 300V-2 generates a distortion feature result 226 based on the one or more distortion features 220. The semantic feature result 216 and the distortion feature result 226, together, are referred to herein as a set of visual feature results 255.

At block 424, the network 100 performs the example step of generating a set of merged visual feature results 255-M based on the set of visual feature results 255 using a temporal fusion module 105 comprising a two-layer perceptron 305. The temporal fusion module 105 in some implementations includes a two-layer perceptron 305. For per-frame feature extraction, in some implementations, the semantic features 210 ($S_i$) and the distortion features 220 ($D_i$) have the dimensions $\mathbb{R}^{1\times L\times 512}$. The temporal fusion module 105, in some implementations, re-shapes the per-frame features 210, 220 into two subsets, which may be expressed as:

$$S_i^r \in \mathbb{R}^{1\times(512\times L)} \text{ and } D_i^r \in \mathbb{R}^{1\times(512\times L)}$$

Subsequently, a two-layer MLP 305 merges these two subsets to generate a set of merged feature results 255-M, which may be expressed as:

$$M_i = \omega(S_i^r, D_i^r)$$

where ω denotes the two layer MLP 305 and $M_i \in \mathbb{R}^{1\times1024}$ represents the temporally merged set of feature results 255-M.

At block 426, the network 100 performs the example step of generating, using a per-clip visual processing module 106 comprising one or more per-clip visual MLPs 300T, a visual captioning feature result 236 based on the one or more visual captioning features 230, an aesthetic feature result 246 based on the one or more aesthetic features 240, an action recognition feature result 256 based on the one or more action recognition features 250, an encoded captioning text based on the captioning text 260, a set of encoded background sound classes based on the one or more background sound classes 270, an encoded title based on the title 280, and an encoded short description based on the short description 290. In some implementations, a per-clip visual MLP 300T-3 generates a visual captioning feature result 236 based on the one or more visual captioning features 230. Another per-clip visual MLP 300T-4 generates an aesthetic feature result 246 based on the one or more aesthetic features 240. Another per-clip visual MLP 300T-5 generates an action recognition feature result 256.

At block 428, the network 100 performs the example step of generating a set of textual features 275 using a text-action merger module 108 comprising one or more cross-attention mechanisms 310C and one or more text-focused MLPs 300M, wherein the set of textual features 275 is based on the encoded captioning text, the encoded background sound classes, the encoded title, and the encoded short description result. As shown in FIG. 3B, the text-action merger module 108 in some implementations uses a first cross-attention mechanism 310C-1 to merge the one or more action recognition features 250 with a text string associated with the encoded captioning text. A text-focused MLP 300M-6 is then used to generate an action-weighted captioning text result 268.

A second cross-attention mechanism 310C-2 is used, in some implementations, to merge the one or more action recognition features 250 with a text string associated with the encoded background sound classes. A text-focused MLP 300M-7 is then used to generate an action-weighted background sound class result 278.

Similarly, a third cross-attention mechanism 310C-3 is used, in some implementations, to merge the one or more action recognition features 250 with a text string associated with the encoded title and the encoded short description. A text-focused MLP 300M-8 is then used to generate an action-weighted title result 288 and an action-weighted short description result 298.

The results 268, 278, 288, 298 are referred to as action-weighted because the process of merging the set of textual features 275 with the visual-quality-type action recognition features 250 introduces a relative importance or weight to each result, based on the extracted action features.

At block 430, the network 100 performs the example step of merging the one or more visual-quality-type action recognition features 250 with the set of textual features 275, using the text-action merger module 108, wherein the text-action merger module 108 produces a set of textual feature results 285 comprising an action-weighted captioning text result 268, an action-weighted background sound class result 278, an action-weighted title result 288, and an action-weighted short description result 298, wherein generating the set of fused features 340 {O} is based on the set of visual feature results 255 and the set of textual feature results 285.

At block 432, the network 100 performs the example step of generating a set of fused features 340 {O} using a fusion module 110 comprising a fusion tool 330F, wherein the set of fused features 340 {O} is based on the set of visual feature results 255, the visual captioning feature result 236, the aesthetic feature result 246, the action recognition feature result 256, the action-weighted captioning text result 268, the action-weighted background sound class result 278, the action-weighted title result 288, and the action-weighted short description result 298. The set of fused features 340 is associated with each of the clips $$\{C_i\}_{i=1}^{M/L}$$

in the video 50. The fusion module 110 in some implementations combines or fuses the results associated with all eight multi-modal features, using eight MLP layers to obtain the set of the fused features 340

$$\{O_i\}_{i=1}^{M/L}.$$

At block 434, the network 100 performs the example step of generating a set of temporal aggregated features 350 {H} using a temporal aggregation module 112 comprising a multi-layer self-attention architecture 345, wherein the set of temporal aggregated features 350 {H} is based on the set of fused features 340 {O}.

At block 436, the network 100 performs the example step of jointly generating a predicted normalized average watch percentage 360 and a predicted engagement continuation rate 370 using a joint prediction module 114 comprising two MLP layers 355, wherein the predicted normalized average watch percentage 360 and the predicted engagement continuation rate 370 is based on the set of temporal aggregated features 350 {H}. The network 100 in some implementations utilizes two MLP layers 355 referred to as $$F_{out}^1, F_{out}^2$$

to jointly predict $$\widehat{NAWP} \text{ and } \widehat{ECR}:$$

$$\widehat{NAWP} = \frac{L}{M}\sum_{i=1}^{\frac{M}{L}} F_{out}^1(H_i); \widehat{ECR} = \frac{L}{5r}\sum_{i=1}^{\frac{5r}{L}} F_{out}^2(H_i)$$

where the predicted $\widehat{ECR}$ is derived from frames within an initial viewing period (e.g., the first five seconds). Joint training for NAWP and ECR produced an enhanced overall performance compared to separate training.

At block 438, the network 100 performs the example step of generating a recommendation 380 associated with the video 50 using a recommendation system 116, wherein the recommendation 380 is based on the predicted normalized average watch percentage 360 and the predicted engagement continuation rate 370.

At block 440, the network 100 identifies a video in response to the recommendation 380 and distributes the video. In an example, the recommendation system 116 identifies one or more other videos in accordance with the recommendation 380 and distributes the identified videos through a network for delivery to consumers of video (e.g., via an application on a user's mobile device).

Techniques described herein may be used with one or more of the computing systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computing systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computing system. As an example, implementations can include distributed processing, component/object distributed processing, and parallel processing. Moreover, virtual computing system processing can be constructed to implement one or more of the techniques or functionalities, as described herein.

Figure 5:
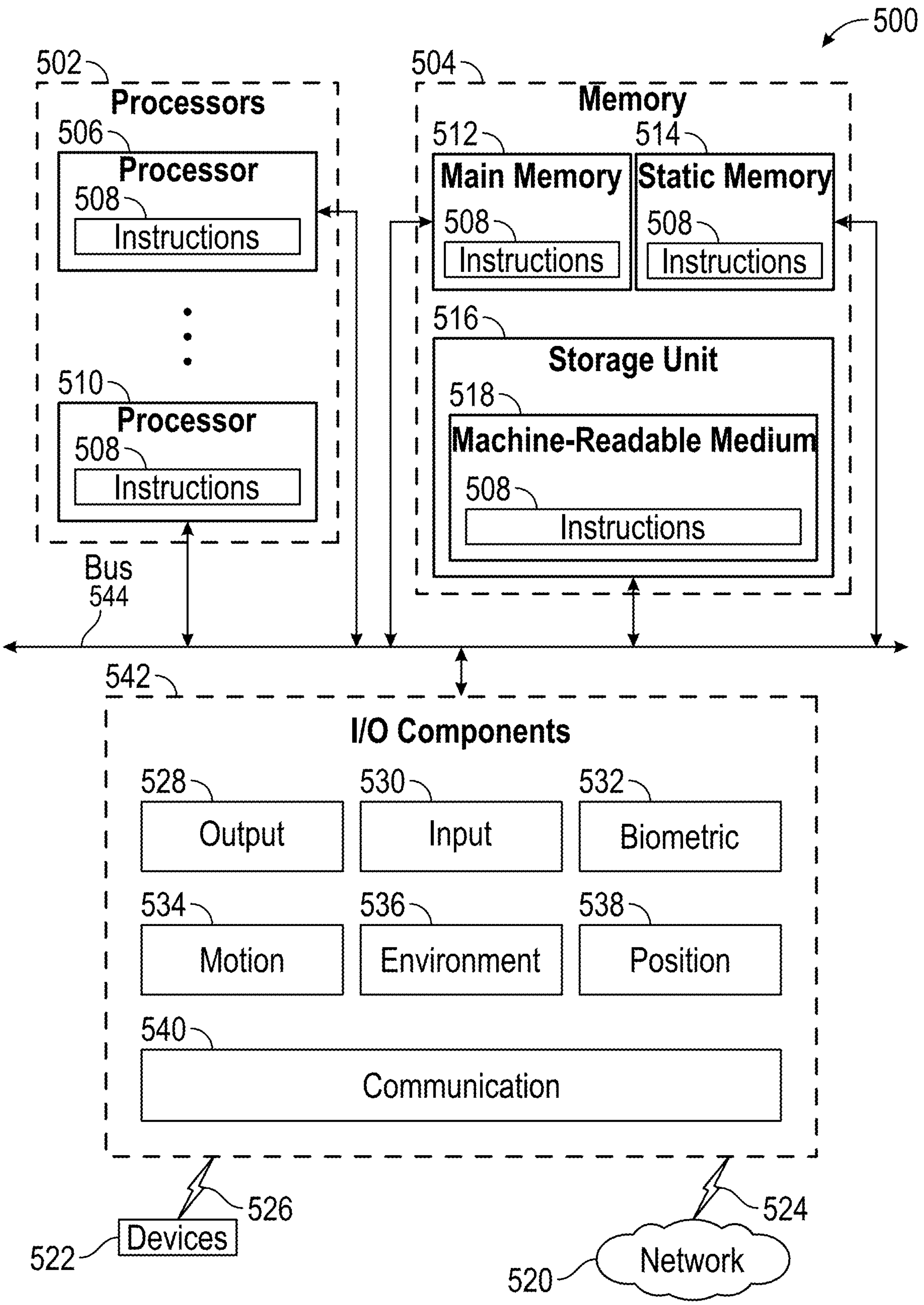
FIG. 5 is a diagrammatic representation of a machine in the form of a computer system within which a set of instructions may be executed for causing the machine to perform any one or more of the methods or processes described herein, in accordance with some examples.

FIG. 5 is a diagrammatic representation of a machine 500 within which instructions 508 (e.g., software, a program, an application, an applet, an app, or other executable code) for causing the machine 500 to perform any one or more of the methodologies discussed herein may be executed. For example, the instructions 508 may cause the machine 500 to execute any one or more of the methods described herein. The instructions 508 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 508, sequentially or otherwise, that specify actions to be taken by the machine 500. Further, while only a single machine 500 is illustrated, the term "machine" shall also be taken to include a collection of machines that individually or jointly execute the instructions 508 to perform any one or more of the methodologies discussed herein.

The machine 500 may include processors 502, memory 504, and input/output (I/O) components 542, which may be configured to communicate with each other via a bus 544. In an example, the processors 502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 506 and a processor 510 that execute the instructions 508. The term "processor" is intended to include multi-core processors that may comprise two or more independent processors (sometimes referred to as "cores") that may execute instructions contemporaneously. Although multiple processors 502 are shown, the machine 500 may include a single processor with a single core, a single processor with multiple cores (e.g., a multi-core processor), multiple processors with a single core, multiple processors with multiples cores, or any combination thereof.

The memory 504 includes a main memory 512, a static memory 514, and a storage unit 516, both accessible to the processors 502 via the bus 544. The main memory 504, the static memory 514, and storage unit 516 store the instructions 508 embodying any one or more of the methodologies or functions described herein. The instructions 508 may also reside, completely or partially, within the main memory 512, within the static memory 514, within machine-readable medium 518 (e.g., a non-transitory machine-readable storage medium) within the storage unit 516, within at least one of the processors 502 (e.g., within the processor's cache memory), or any suitable combination thereof, during execution thereof by the machine 500.

Furthermore, the machine-readable medium 518 is non-transitory (in other words, not having any transitory signals) in that it does not embody a propagating signal. However, labeling the machine-readable medium 518 "non-transitory" should not be construed to mean that the medium is incapable of movement; the medium should be considered as being transportable from one physical location to another. Additionally, since the machine-readable medium 518 is tangible, the medium may be a machine-readable device.

The I/O components 542 may include a wide variety of components to receive input, provide output, produce output, transmit information, exchange information, capture measurements, and so on. The specific I/O components 542 that are included in a particular machine will depend on the type of machine. For example, portable machines such as mobile phones may include a touch input device or other such input mechanisms, while a headless server machine will likely not include such a touch input device. It will be appreciated that the I/O components 542 may include many other components that are not shown. In various examples, the I/O components 542 may include output components 528 and input components 530. The output components 528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, a resistance feedback mechanism), other signal generators, and so forth. The input components 530 may include alphanumeric input components (e.g., a keyboard, a touch screen configured to receive alphanumeric input, a photo-optical keyboard, or other alphanumeric input components), pointing-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 542 may include biometric components 532, motion components 534, environmental components 536, or position components 538, among a wide array of other components. For example, the biometric components 532 include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 include acceleration sensor components (e.g., accelerometer), gravitation sensor components, rotation sensor components (e.g., gyroscope), and so forth. The environmental components 536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 542 further include communication components 540 operable to couple the machine 500 to a network 520 or devices 522 via a coupling 524 and a coupling 526, respectively. For example, the communication components 540 may include a network interface component or another suitable device to interface with the network 520. In further examples, the communication components 540 may include wired communication components, wireless communication components, cellular communication components, Near-field Communication (NFC) components, Bluetooth® components (e.g., Bluetooth® Low Energy), Wi-Fi® components, and other communication components to provide communication via other modalities. The devices 522 may be another machine or any of a wide variety of peripheral devices (e.g., a peripheral device coupled via a USB).

Moreover, the communication components 540 may detect identifiers or include components operable to detect identifiers. For example, the communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via Internet Protocol (IP) geolocation, location via Wi-Fi® signal triangulation, location via detecting an NFC beacon signal that may indicate a particular location, and so forth.

The various memories (e.g., memory 504, main memory 512, static memory 514, memory of the processors 502), storage unit 516 may store one or more sets of instructions and data structures (e.g., software) embodying or used by any one or more of the methodologies or functions described herein. These instructions (e.g., the instructions 508), when executed by processors 502, cause various operations to implement the disclosed examples.

The instructions 508 may be transmitted or received over the network 520, using a transmission medium, via a network interface device (e.g., a network interface component included in the communication components 540) and using any one of a number of well-known transfer protocols (e.g., hypertext transfer protocol (HTTP)). Similarly, the instructions 508 may be transmitted or received using a transmission medium via the coupling 526 (e.g., a peer-to-peer coupling) to the devices 522.

Figure 6:
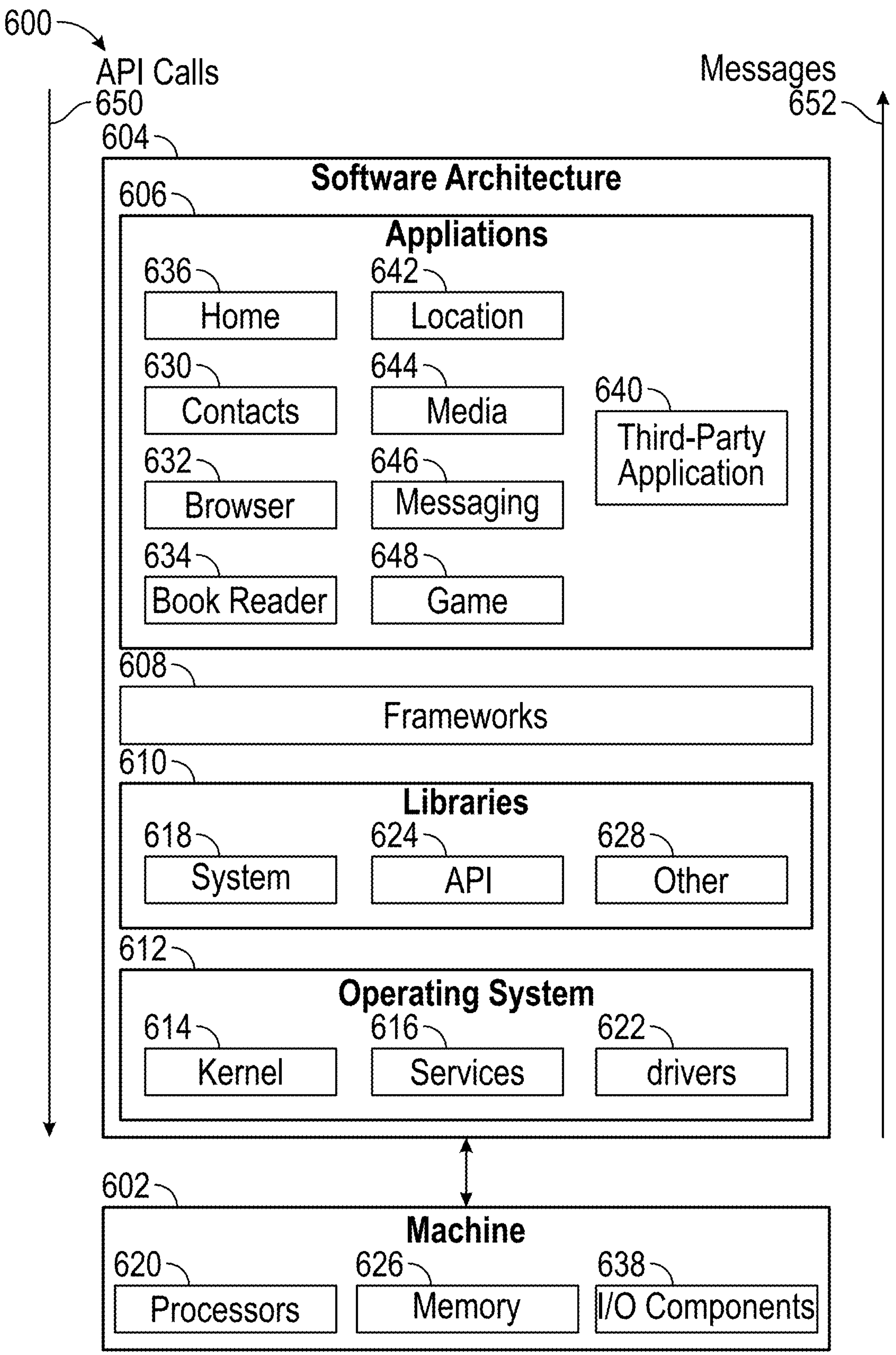
FIG. 6 is a block diagram showing a software architecture within which the present disclosure may be implemented, in accordance with examples.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, Bluetooth® or Bluetooth® Low Energy (BLE) drivers, flash memory drivers, serial communication drivers (e.g., Universal Serial Bus (USB) drivers), Wi-Fi® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., a WebKit® engine to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The third-party applications 640 are programs that execute functions defined within the programs.

In a specific example, a third-party application 640 (e.g., an application developed using the Google Android or Apple iOS software development kit (SDK) by an entity other than the vendor of the particular platform) may be mobile software running on a mobile operating system such as Google Android, Apple iOS (for iPhone or iPad devices), Windows Mobile, Amazon Fire OS, RIM BlackBerry OS, or another mobile operating system. In this example, the third-party application 640 can invoke the API calls 650 provided by the operating system 612 to facilitate functionality described herein.

Various programming languages can be employed to create one or more of the applications 606, structured in a variety of manners, such as object-oriented programming languages (e.g., Objective-C, Java, C++, or R) or procedural programming languages (e.g., C or assembly language). For example, R is a programming language that is particularly well suited for statistical computing, data analysis, and graphics.

Functionality described herein can be embodied in one or more computer software applications or sets of programming instructions. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™ WINDOWS® Phone, or another mobile operating system. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A network for predicting user engagement with video content, the network comprising: a video comprising a set of clips, each clip containing a plurality of frames; an extraction module comprising one or more networks operable to extract one or more per-frame features associated with one or more of the plurality of frames in each clip in the set of clips, one or more models operable to extract one or more per-clip features associated with each clip in the set of clips, and one or more encoders operable to encode one or more text features associated with each video; a per-frame visual processing module comprising one or more per-frame visual multi-layer perceptrons (MLPs) operable to generate a set of per-frame feature results associated with the one or more per-frame features; a per-clip visual processing module comprising one or more per-clip visual MLPs operable to generate a set of per-clip feature results associated with the one or more per-clip features, and to generate a set of text feature results associated with the one or more text features; a fusion module comprising a fusion tool operable to generate a set of fused features $\{O\}$ based on the set of per-frame feature results, the set of per-clip feature results, and the set of text feature results; a temporal aggregation module comprising a multi-layer self-attention architecture operable to generate a set of temporal aggregated features $\{H\}$ based on the set of fused features $\{O\}$; a joint prediction module comprising two MLP layers operable to jointly generate a predicted normalized action watch percentage and a predicted engagement continuation rate based on the set of temporal aggregated features $\{H\}$; and a recommendation system operable to generate a recommendation associated with the video, wherein the recommendation is based on the predicted normalized action watch percentage and the predicted engagement continuation rate.

2. The network of claim 1, wherein the one or more per-frame features comprises one or more semantic features and one or more distortion features, wherein the one or more networks operable to extract per-frame features comprises: an image classification network operable to extract the one or more semantic features associated with one or more of the plurality of frames in each clip in the set of clips; and a distortion recognition network operable to extract the one or more distortion features associated with one or more of the plurality of frames in each clip in the set of clips, and wherein the set of per-frame feature results generated by the visual processing module comprises a semantic feature result based on the one or more semantic features and a distortion feature result based on the one or more distortion features.

3. The network of claim 2, further comprising:

a temporal fusion module comprising a two-layer perceptron operable to generate a set of merged visual feature results based on the set of per frame feature results, wherein the set of fused features $\{O\}$ is based on the set of merged visual feature results.

4. The network of claim 1, wherein the one or more per-clip features comprise one or more visual captioning features, one or more aesthetic features, and one or more action recognition features, wherein the one or more models operable to extract the one or more per-clip features comprises: a visual captioning model operable to extract the one or more visual captioning features associated with each clip in the set of clips; a video quality evaluator operable to extract the one or more aesthetic features associated with each clip in the set of clips; an action recognition network operable to extract the one or more action recognition features associated with each clip in the set of clips, and wherein the set of per-clip feature results generated by the per-clip visual processing module comprises a visual captioning feature result based on the one or more visual captioning features, an aesthetic feature result based on the one or more aesthetic features, and an action recognition feature result based on the one or more action recognition features.

5. The network of claim 4, wherein the one or more text features comprises a captioning text, one or more background sound classes, a title, and a short description, wherein the one or more encoders operable to encode text features comprises: a caption text encoder operable to encode the captioning text associated with the video; a sound class text encoder operable to encode the one or more background sound classes associated with the video; a descriptive text encoder operable to encode the title and the short description associated with the video, and wherein the set of text feature results generated by the per-clip visual processing module comprises an encoded captioning text, encoded background sound classes, an encoded title, and an encoded short description.

6. The network of claim 5, further comprising a classification model operable to generate the one or more background sound classes based on a background sound associated with the video.

7. The network of claim 5, further comprising: a text-action merger module comprising one or more cross-attention mechanisms and one or more text-focused MLPs, wherein the text-action merger module is operable to generate a set of textual features based on the encoded captioning text, the encoded background sound classes, the encoded title, and the encoded short description, and wherein the text-action merger module merges the one or more action recognition features with the set of textual features to produce a set of textual feature results comprising an action-weighted captioning text result, an action-weighted background sound class result, an action-weighted title result, and an action-weighted short description result; and wherein the fusion module generates the set of fused features $\{O\}$ based on the set of per-frame feature results, the set of per-clip feature results, the set of text feature results, and the set of textual feature results.

8. The network of claim 5, further comprising one or more cross-attention mechanisms associated with the descriptive text encoder, such that encoding the title occurs separately from encoding the short description.

9. A method of predicting user engagement with video content, comprising: splitting a video into a set of clips, each containing a plurality of frames; extracting one or more per-frame features associated with one or more of the plurality of frames in each clip in the set of clips using one or more networks; extracting one or more per-clip features associated with each clip in the set of clips using one or more models; encoding one or more text features associated with each video using one or more encoders; generating a set of per-frame feature results associated with the one or more per-frame features using a per-frame visual processing module comprising one or more per-frame visual MLP; generating a set of per-clip feature results associated with the one or more per-clip features using a per-clip visual processing module; generating a set of text feature results associated with the one or more text features using a textual processing module; generating a set of fused features {O} using a fusion module comprising a fusion tool, wherein the set of fused features {O} is based on the set of per-frame feature results, the set of per-clip feature results, and the set of text feature results; generating a set of temporal aggregated features {H} based on the set of fused features {O} using a temporal aggregation module comprising a multi-layer self-attention architecture; jointly generating a predicted normalized action watch percentage and a predicted engagement continuation rate based on the set of temporal aggregated features {H} using a joint prediction module comprising two MLP layers; and generating a recommendation associated with the video using a recommendation system, wherein the recommendation is based on the predicted normalized action watch percentage and the predicted engagement continuation rate.

10. The method of claim 9, wherein extracting the one or more per-frame features comprises extracting one or more semantic features and extracting one or more distortion features, wherein the one or more networks comprises: an image classification network operable to extract the one or more semantic features associated with one or more of the plurality of frames in each clip in the set of clips; and a distortion recognition network operable to extract the one or more distortion features associated with one or more of the plurality of frames in each clip in the set of clips, and wherein generating the set of per-frame feature results comprises generating a semantic feature result based on the one or more semantic features and generating a distortion feature result based on the one or more distortion features.

11. The method of claim 10, further comprising:

generating a set of merged visual feature results based on the set of per frame feature results using a temporal fusion module comprising a two-layer perceptron, wherein the set of fused features {O} is based on the set of merged visual feature results.

12. The method of claim 9, wherein extracting the one or more per-clip features comprises extracting one or more visual captioning features, one or more aesthetic features, and one or more action recognition features, wherein the one or more models comprises: a visual captioning model operable to extract the one or more visual captioning features associated with each clip in the set of clips; a video quality evaluator operable to extract the one or more aesthetic features associated with each clip in the set of clips; an action recognition network operable to extract the one or more action recognition features associated with each clip in the set of clips, and wherein generating the set of text per-clip feature results comprises generating a visual captioning feature result based on the one or more visual captioning features, generating an aesthetic feature result based on the one or more aesthetic features, and generating an action recognition feature result based on the one or more action recognition features.

13. The method of claim 12, wherein encoding the text features comprises encoding a captioning text, one or more background sound classes, a title, and a short description, wherein the one or more encoders comprises: a caption text encoder operable to encode the captioning text associated with the video; a sound class text encoder operable to encode the one or more background sound classes associated with the video; a descriptive text encoder operable to encode the title and the short description associated with the video, and wherein generating the set of text feature results comprises generating an encoded captioning text, encoded background sound classes, an encoded title, and an encoded short description.

14. The method of claim 13, further comprising: generating the one or more background sound classes based on a background sound associated with the video using a classification model.

15. The method of claim 13, further comprising:

generating, using a text-action merger module, a set of textual features based on the encoded captioning text, the encoded background sound classes, the encoded title, and the encoded short description, wherein the text-action merger module comprises one or more cross-attention mechanisms and one or more text-focused MLP;

merging the one or more action recognition features with the set of textual features to produce a set of textual feature results comprising an action-weighted captioning text result, an action-weighted background sound class result, an action-weighted title result, and an action-weighted short description result; and generating the set of fused features {O} based on the set of per-frame feature results, the set of per-clip feature results, the set of text feature results, and the set of textual feature results.

16. The method of claim 13, further comprising: encoding the title separately from encoding the short description, using one or more cross-attention mechanisms associated with the descriptive text encoder.

17. A non-transitory computer-readable medium storing program code comprising instructions configured to cause an electronic processor, upon execution of the instructions, to:

split a video into a set of clips, each containing a plurality of frames;

extract one or more semantic features from one or more of the plurality of frames in each clip in the set of clips using an image classification network;

extract one or more distortion features from one or more of the plurality of frames in each clip in the set of clips using a distortion recognition network;

extract one or more visual captioning features associated with each clip in the set of clips using a visual captioning model;

extract one or more aesthetic features associated with each clip in the set of clips using a video quality evaluator;

extract one or more action recognition features associated with each clip in the set of clips using an action recognition network;

encode a captioning text associated with the video using a caption text encoder;

generate one or more background sound classes based on a background sound associated with the video;

encode the one or more background sound classes using a sound class text encoder;

encode a title and a short description associated with the video using a descriptive text encoder;

generate a set of visual feature results using a per-frame visual processing module comprising one or more per-frame visual multi-layer perceptrons (MLP), wherein the set of visual feature results comprises a semantic feature result based on the one or more semantic features, and a distortion feature result based on the one or more distortion features;

generate, using a per-clip visual processing module comprising one or more per-clip visual MLPs, a visual captioning feature result based on the one or more visual captioning features, an aesthetic feature result based on the one or more aesthetic features, an action recognition feature result based on the one or more action recognition features, a captioning text result based on the captioning text, a background sound class result based on the one or more background sound classes, a title result based on the title, and a short description result based on the short description;

generate a set of fused features {O} using a fusion module comprising a fusion tool, wherein the set of fused features {O} is based on the set of visual feature results, the visual captioning feature result, the aesthetic feature result, the action recognition feature result, the captioning text result, the background sound class result, the title result, and the short description result;

generate a set of temporal aggregated features {H} using a temporal aggregation module comprising a multi-layer self-attention architecture, wherein the set of temporal aggregated features {H} is based on the set of fused features {O};

jointly generate a predicted normalized action watch percentage and a predicted engagement continuation rate using a joint prediction module comprising two MLP layers, wherein the predicted normalized action watch percentage and the predicted engagement continuation rate are based on the set of temporal aggregated features {H}; and generate a recommendation associated with the video using a recommendation system, wherein the recommendation is based on the predicted normalized action watch percentage and the predicted engagement continuation rate.

18. The non-transitory computer-readable medium of claim 17, wherein the instructions are further configured to cause the electronic processor, upon execution of the instructions, to: generate a set of merged visual feature results based on the set of visual feature results using a temporal fusion module comprising a two-layer perceptron, wherein the set of fused features {O} is based on the set of merged visual feature results.

19. The non-transitory computer-readable medium of claim 17, wherein the instructions are further configured to cause the electronic processor, upon execution of the instructions, to:

generate a set of textual features using a text-action merger module comprising one or more cross-attention mechanisms and one or more text-focused MLPs, wherein the set of textual features is based on an encoded captioning text, one or more encoded background sound classes, the encoded title, and the encoded short description;

merge the one or more action recognition features with the set of textual features, using the text-action merger module, wherein the text-action merger module produces a set of textual feature results comprising an action-weighted captioning text result, an action-weighted background sound class result, an action-weighted title result, and an action-weighted short description result; and generate the set of fused features {O} is based on the set of visual feature results and the set of textual feature results.

20. The non-transitory computer-readable medium of claim 17, wherein the instructions are further configured to cause the electronic processor, upon execution of the instructions, to: encode the title and encode the short description using a descriptive text encoder in conjunction with one or more cross-attention mechanisms, such that encoding the title occurs separately from encoding the short description.

* * * * *